(12) United States Patent
Kimura et al.

(10) Patent No.: US 8,638,776 B2
(45) Date of Patent: Jan. 28, 2014

(54) FRAME GENERATING DEVICE, RECEIVING DEVICE, DATA TRANSMITTING/RECEIVING SYSTEM, FRAME GENERATING METHOD, AND RECEIVING METHOD

(75) Inventors: Yoshimasa Kimura, Chiba (JP); Fumio Suzuki, Chiba (JP); Koichi Moriya, Chiba (JP)

(73) Assignee: OTSL Inc. (JP)

( * ) Notice: Subject to any disclaimer, the term of this patent is extended or adjusted under 35 U.S.C. 154(b) by 157 days.

(21) Appl. No.: 12/737,502

(22) PCT Filed: Aug. 3, 2009

(86) PCT No.: PCT/JP2009/003686
§ 371 (c)(1),
(2), (4) Date: Mar. 3, 2011

(87) PCT Pub. No.: WO2010/016225
PCT Pub. Date: Feb. 11, 2010

(65) Prior Publication Data
US 2011/0164606 A1    Jul. 7, 2011

(30) Foreign Application Priority Data

Aug. 4, 2008 (JP) ................................ 2008-201276

(51) Int. Cl.
*H04J 3/06* (2006.01)
(52) U.S. Cl.
USPC ........................................................ 370/350
(58) Field of Classification Search
USPC ......... 370/229–231, 235, 236, 241, 252, 310, 370/345, 350–351, 389, 390, 392, 393, 912, 370/913
See application file for complete search history.

(56) References Cited

U.S. PATENT DOCUMENTS 6,226,495 B1 * 5/2001 Neustein .................... 340/311.2
6,459,691 B1 10/2002 Abe ............................... 370/335
(Continued)

FOREIGN PATENT DOCUMENTS

| CN | 1163545 | 10/1997 |
|---|---|---|
| CN | 1452081 | 10/2003 |

(Continued)

OTHER PUBLICATIONS

PTO Office Action mailed Aug. 15, 2012 in U.S. Appl. No. 12/737,503.

(Continued)

*Primary Examiner* — Omar Ghowrwal
(74) *Attorney, Agent, or Firm* — Adams & Wilks

(57) ABSTRACT

A frame generation device has a frame generation section that generates a frame including synchronization information for achieving synchronization with a reception device from among a group including one or more reception devices each of which receives information within the frame, address information indicating an address within the frame for transmitting data, and data transmitted to the reception device included in the group. A group-basis distribution data presence/absence information generation section generates group-basis distribution data presence/absence information indicating whether or not the transmitted data is included in the frame. A synchronization information generation section generates synchronization information including the group-basis distribution data presence/absence information. The frame generation section generates the frame such that the group-basis distribution data presence/absence information is allocated prior to the address information. A central processing unit controls operation of the frame generation section, group-basis distribution data presence/absence information generation section, and synchronization information generation section.

10 Claims, 19 Drawing Sheets

(56) References Cited

U.S. PATENT DOCUMENTS

| | | | |
|---|---|---|---|
| 8,149,880 B1* | 4/2012 | Cho et al. | 370/503 |
| 2004/0240453 A1 | 12/2004 | Ikeda et al. | 370/395.21 |
| 2005/0254444 A1 | 11/2005 | Meier et al. | 370/312 |
| 2006/0062244 A1 | 3/2006 | Oksman | 370/465 |
| 2006/0146887 A1 | 7/2006 | Muguruma et al. | 370/503 |
| 2007/0201467 A1 | 8/2007 | Kakani | 370/390 |
| 2007/0201468 A1 | 8/2007 | Jokela | 370/390 |
| 2009/0129308 A1* | 5/2009 | Fukui | 370/315 |

FOREIGN PATENT DOCUMENTS

| | | |
|---|---|---|
| EP | 0319219 | 6/1989 |
| JP | 05114883 | 5/1993 |
| JP | 09307964 | 11/1997 |
| JP | 11177523 | 7/1999 |
| JP | 11252009 | 9/1999 |
| JP | 2001128256 | 5/2001 |
| JP | 2001326600 | 11/2001 |
| JP | 2003298644 | 10/2003 |
| JP | 2007312134 | 11/2007 |
| JP | 2007312314 | 11/2007 |
| JP | 2008506286 | 2/2008 |
| WO | 2006006069 | 1/2006 |
| WO | 2006115999 | 11/2006 |

OTHER PUBLICATIONS

European Search Report dated Apr. 22, 2013, Appln. No. PCT/JP2009003686, cover pg., pp. 1-5, Supplementary European Search Report and Annex to the European Search Report.

Chinese Office Action and its English-language machine translation dated Mar. 28, 2013, Appin. No. 200980131141.4.

European Search Report dated Apr. 22, 2013, Appln. No. EP 09804712.9 , cover pg., pp. 1-5, Supplementary European Search Report and Annex to the European Search.

Chinese Office Action and its English-language machine translation dated Mar. 28, 2013, Appln. No. 200980131141.4.

Japanese Decision of Rejection mailed Oct. 22, 2013 issued in Japanese Appln. No. 2010-523882.

JPO Notice of Reasons for Rejection mailed Aug. 6, 2013 issued in Japanese Appln. No. 2010-523882 together with English-language translation.

* cited by examiner

FRAME GENERATING DEVICE, RECEIVING DEVICE, DATA TRANSMITTING/RECEIVING SYSTEM, FRAME GENERATING METHOD, AND RECEIVING METHOD

CROSS-REFERENCE TO RELATED APPLICATIONS

This application is a U.S. national stage application of International Application No. PCT/JP2009/003686 filed Aug. 3, 2009, claiming a priority date of Aug. 4, 2008, and published in a non-English language.

BACKGROUND OF THE INVENTION

1. Technical Field

The present invention relates to a frame generation device, a reception device, a data transmission/reception system, a frame generation method, and a reception method which are used for performing radio communications.

The present application claims priority from Japanese Patent Application No. 2008-201276 filed in Japan on Aug. 4, 2008, the content of which is hereby incorporated by reference into this application.

2. Background Art

Up to now, there is known a data transmission/reception system using radio communications to perform data transmission from a transmission device to a plurality of reception devices, in which data is transmitted by using a frame including synchronization information, address information for identifying and calling a reception device to which the data is to be transmitted from among the plurality of reception devices, and the data addressed to the reception device (see, for example, Patent Literature 1).

CITATION LIST

Patent Literature

[PTL 1]: JP 2001-326600 A

However, in the data transmission/reception system disclosed in Patent Literature 1, each of the reception devices performs determination as to whether or not the data addressed to the own reception device is to be transmitted by checking contents of the address information transmitted subsequently to the synchronization information. Therefore, the reception device always needs to check the address information, which increases a reception operation time period. This raises a problem that the reception device consumes large power. In addition, because the reception device consumes large power, there is a problem that a battery operation time period becomes short in a case where the reception device operates on a battery.

A problem to be solved is to further reduce power consumption caused by the reception device.

SUMMARY OF THE INVENTION

A frame generation device according to the present invention, includes: a frame generation section for generating a frame including, in the following order: synchronization information being information for achieving synchronization with a reception device that receives information within the frame used for radio communications; address information indicating an address within the frame for transmitting data; and the data to be transmitted to the reception device; a presence/absence information generation section for generating distribution data presence/absence information indicating whether or not the data to be transmitted to the reception device included in a group that includes one or a plurality of reception devices is included in the frame; and a synchronization information generation section for generating the synchronization information including the distribution data presence/absence information.

Further, a frame generation device according to the present invention, includes: a frame generation section for generating a frame including, in the following order: synchronization information being information for achieving synchronization with a reception device that receives information within the frame used for radio communications; address information indicating an address within the frame for transmitting data; and the data to be transmitted to the reception device; an address information transmission start information generation section for generating address information transmission start information indicating a timing at which transmission of the address information that indicates the address of the data to be transmitted to the reception device included in a group that includes one or a plurality of reception devices is started; and a synchronization information generation section for generating the synchronization information including the address information transmission start information.

Further, a reception device according to the present invention, includes: a reception section for receiving synchronization information, address information, and data, the synchronization information including distribution data presence/absence information indicating whether or not the data to be transmitted to the reception device included in a group that includes one or a plurality of reception devices is included in a frame including, in the following order: the synchronization information being information for achieving synchronization with a transmission device that transmits the frame used for radio communications; the address information indicating an address within the frame for transmitting the data; and the data to be transmitted to the reception device; a determination section for determining, based on the distribution data presence/absence information, whether or not the address information is to be transmitted to an own reception device by the frame; and a power supply control section for controlling a power supply to the reception section, in which: the power supply control section supplies power to the reception section if the determination section determines that the address information is to be transmitted; and the power supply control section interrupts the power being supplied to the reception section if the determination section determines that the address information is not to be transmitted.

Further, a reception device according to the present invention, includes: a reception section for receiving synchronization information, address information, and data, the synchronization information including address information transmission start information indicating a timing at which transmission of the address information, which indicates an address of the data to be transmitted to the reception device included in a group that includes one or a plurality of reception devices, is started within a frame including, in the following order: the synchronization information being information for achieving synchronization with a transmission device that transmits the frame used for radio communications; the address information indicating the address within the frame for transmitting the data; and the data to be transmitted to the reception device; and a power supply control section for keeping interrupting a power supply to the reception section until the address information is transmitted to an own reception device based on the address information transmission start information.

Further, a data transmission/reception system according to the present invention, includes: a frame generation device; a reception device; and a transmission device for transmitting a frame generated by the frame generation device to the reception device, in which: the frame generation device includes: a frame generation section for generating the frame including, in the following order: synchronization information being information for achieving synchronization with the reception device that receives information within the frame used for radio communications; address information indicating an address within the frame for transmitting data; and the data to be transmitted to the reception device; a presence/absence information generation section for generating distribution data presence/absence information indicating whether or not the data to be transmitted to the reception device included in a group that includes one or a plurality of reception devices is included in the frame; and a synchronization information generation section for generating the synchronization information including the distribution data presence/absence information; the reception device includes: a reception section for receiving the synchronization information, the address information, and the data, the synchronization information including the distribution data presence/absence information indicating whether or not the data to be transmitted to the reception device included in the group that includes the one or the plurality of reception devices is included in the frame including, in the following order: the synchronization information being information for achieving synchronization with the transmission device that transmits the frame used for radio communications; the address information indicating the address within the frame for transmitting the data; and the data to be transmitted to the reception device; a determination section for determining, based on the distribution data presence/absence information, whether or not the address information is to be transmitted to an own reception device by the frame; and a power supply control section for controlling a power supply to the reception section; the power supply control section supplies power to the reception section if the determination section determines that the address information is to be transmitted; and the power supply control section interrupts the power being supplied to the reception section if the determination section determines that the address information is not to be transmitted.

Further, a data transmission/reception system according to the present invention, includes: a frame generation device; a reception device; and a transmission device for transmitting a frame generated by the frame generation device to the reception device, in which: the frame generation device includes: a frame generation section for generating a frame including, in the following order: synchronization information being information for achieving synchronization with the reception device that receives information within the frame used for radio communications; address information indicating an address within the frame for transmitting data; and the data to be transmitted to the reception device; an address information transmission start information generation section for generating address information transmission start information indicating a timing at which transmission of the address information that indicates the address of the data to be transmitted to the reception device included in a group that includes one or a plurality of reception devices is started; and a synchronization information generation section for generating the synchronization information including the address information transmission start information; and the reception device includes: a reception section for receiving the synchronization information, the address information, and the data, the synchronization information including the address information transmission start information indicating the timing at which the transmission of the address information, which indicates the address of the data to be transmitted to the reception device included in the group that includes the one or the plurality of reception devices, is started within the frame including, in the following order: the synchronization information being information for achieving synchronization with the transmission device that transmits the frame used for radio communications; the address information indicating the address within the frame for transmitting the data; and the data to be transmitted to the reception device; and a power supply control section for keeping interrupting a power supply to the reception section until the address information is transmitted to an own reception device based on the address information transmission start information.

Further, a frame generation method according to the present invention, includes: a frame generation step of generating a frame including, in the following order: synchronization information being information for achieving synchronization with a reception device that receives information within the frame used for radio communications; address information indicating an address within the frame for transmitting data; and the data to be transmitted to the reception device; a presence/absence information generation step of generating distribution data presence/absence information indicating whether or not the data to be transmitted to the reception device included in a group that includes one or a plurality of reception devices is included in the frame; and a synchronization information generation step of generating the synchronization information including the distribution data presence/absence information.

Further, a frame generation method according to the present invention, includes: a frame generation step of generating a frame including, in the following order: synchronization information being information for achieving synchronization with a reception device that receives information within the frame used for radio communications; address information indicating an address within the frame for transmitting data; and the data to be transmitted to the reception device; an address information transmission start information generation step of generating address information transmission start information indicating a timing at which transmission of the address information that indicates the address of the data to be transmitted to the reception device included in a group that includes one or a plurality of reception devices is started; and a synchronization information generation step of generating the synchronization information including the address information transmission start information.

Further, a reception method according to the present invention is a reception method for a reception device including a reception section, a determination section, and a power supply control section, the reception method including: a reception step of receiving, by the reception section, synchronization information, address information, and data, the synchronization information including distribution data presence/absence information indicating whether or not the data to be transmitted to the reception device included in a group that includes one or a plurality of reception devices is included in a frame including, in the following order: the synchronization information being information for achieving synchronization with a transmission device that transmits the frame used for radio communications; the address information indicating an address within the frame for transmitting the data; and the data to be transmitted to the reception device; a determination step of determining, by the determination section, based on the distribution data presence/absence information, whether or not the address information is to be transmitted to an own reception device by the frame; and a power supply control step of controlling, by the power supply control section, a power supply to the reception section, in which: the power supply control step includes supplying power to the reception section if it is determined in the determination step that the address information is to be transmitted; and the power supply control step includes interrupting the power being supplied to the reception section if it is determined in the determination step that the address information is not to be transmitted.

Further, a reception method according to the present invention is a reception method for a reception device including a reception section, a determination section, and a power supply control section, the reception method including: a reception step of receiving, by the reception section, synchronization information, address information, and data, the synchronization information including address information transmission start information indicating a timing at which transmission of the address information, which indicates an address of the data to be transmitted to the reception device included in a group that includes one or a plurality of reception devices is started within a frame including, in the following order: the synchronization information being information for achieving synchronization with a transmission device that transmits the frame used for radio communications; the address information indicating the address within the frame for transmitting the data; and the data to be transmitted to the reception device; and a power supply control step of keeping interrupting a power supply to the reception section until the address information is transmitted to an own reception device based on the address information transmission start information.

The present invention is advantageous in that it is possible to further reduce power consumption caused by the reception device. In particular, in a case where there are a large number of the reception devices that receive a frame transmitted from one transmission device, it is possible to perform the determination as to whether or not the address information with respect to the group including the own reception device is to be transmitted, and it is unnecessary to receive the address information to be sent to a group that does not include the own reception device, which can further reduce the power consumption.

DETAILED DESCRIPTION OF THE INVENTION (First Embodiment)

Figure 1:
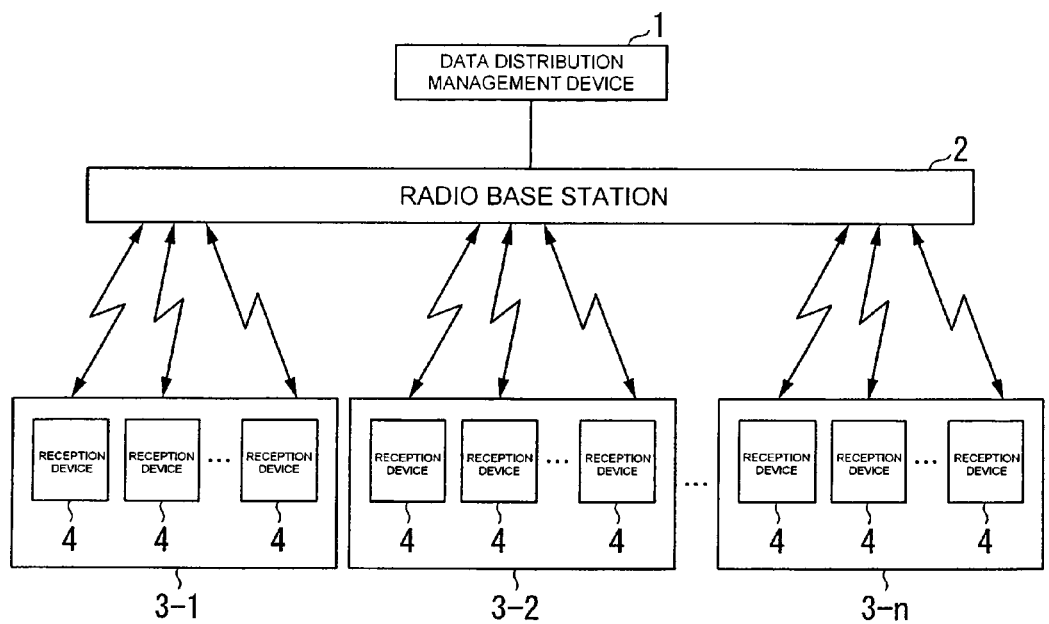
FIG. 1 is a structural diagram illustrating a structure of a data transmission/reception system according to a first embodiment.

Hereinafter, a first embodiment of the present invention is described with reference to the drawings. FIG. 1 is a structural diagram illustrating a structure of a data transmission/reception system according to the first embodiment. In the example illustrated in the figure, the data transmission/reception system includes a data distribution management device 1 (frame generation device), a radio base station 2 (transmission device), and reception device groups 3-1 to 3-*n*. The reception device groups 3-1 to 3-*n* each include one or a plurality of reception devices 4.

The data distribution management device 1 and the radio base station 2 are connected to each other by a wired or wireless network, and can transmit/receive information to/from each other. Further, the radio base station 2 is connected to the one or the plurality of reception devices 4 by wireless networks, and can transmit/receive information to/from each other. In the example illustrated in the figure, the radio base station 2 is connected to the reception devices 4 included in the reception device groups 3-1 to 3-n by wireless networks, and can transmit/receive information to/from each other.

The data distribution management device 1 generates a frame to be transmitted to the reception devices 4 via the radio base station 2. The frame is described later. Further, the data distribution management device 1 manages a timing at which the created frame is transmitted to the reception devices 4.

The radio base station 2 transmits to the reception devices 4 the frame transmitted from the data distribution management device 1. The reception devices 4 receive information included in the frame transmitted from the data distribution management device 1 via the radio base station 2.

It is noted that the data transmission/reception system according to this embodiment is, for example, an electronic shelf label system. Specifically, the reception devices 4 are electronic shelf labels each provided with a display section, and the data distribution management device 1 transmits information including trade names and commodity prices to be displayed in the display sections of the reception devices 4 to the reception devices 4 via the radio base station 2. Meanwhile, each of the reception devices 4 that have received the information including trade names and commodity prices transmitted from the data distribution management device 1 displays a trade name, a commodity price, and the like in its own display section based on the received information including trade names and commodity prices.

Figure 2:
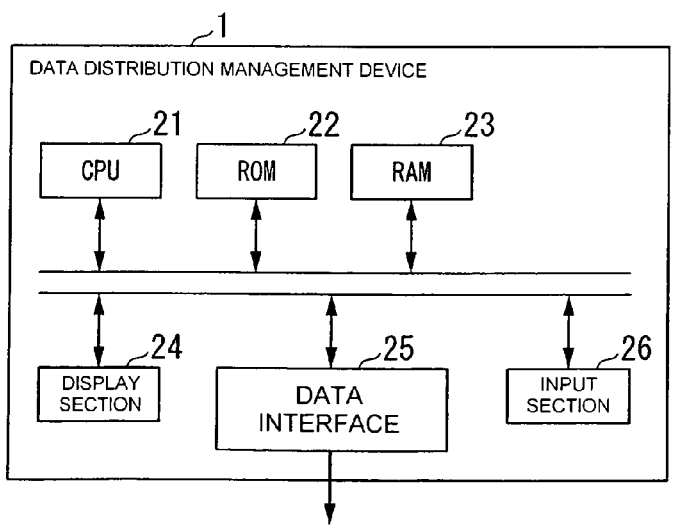
FIG. 2 is a block diagram illustrating a physical configuration of a data distribution management device according to the first embodiment.

FIG. 2 is a block diagram illustrating a physical configuration of the data distribution management device 1 according to this embodiment. In the example illustrated in the figure, the data distribution management device 1 includes a central processing unit (CPU) 21, a read only memory (ROM) 22, a random access memory (RAM) 23, a display section 24, a data interface 25, and an input section 26.

The CPU 21 carries out a processing of the data distribution management device 1. The ROM 22 and the RAM 23 store information used by the data distribution management device 1. The display section 24 is, for example, a liquid crystal display or the like, and displays information therein. The data interface 25 performs transmission/reception of information to/from another device. The input section 26 receives an input to the data distribution management device 1.

Figure 3:
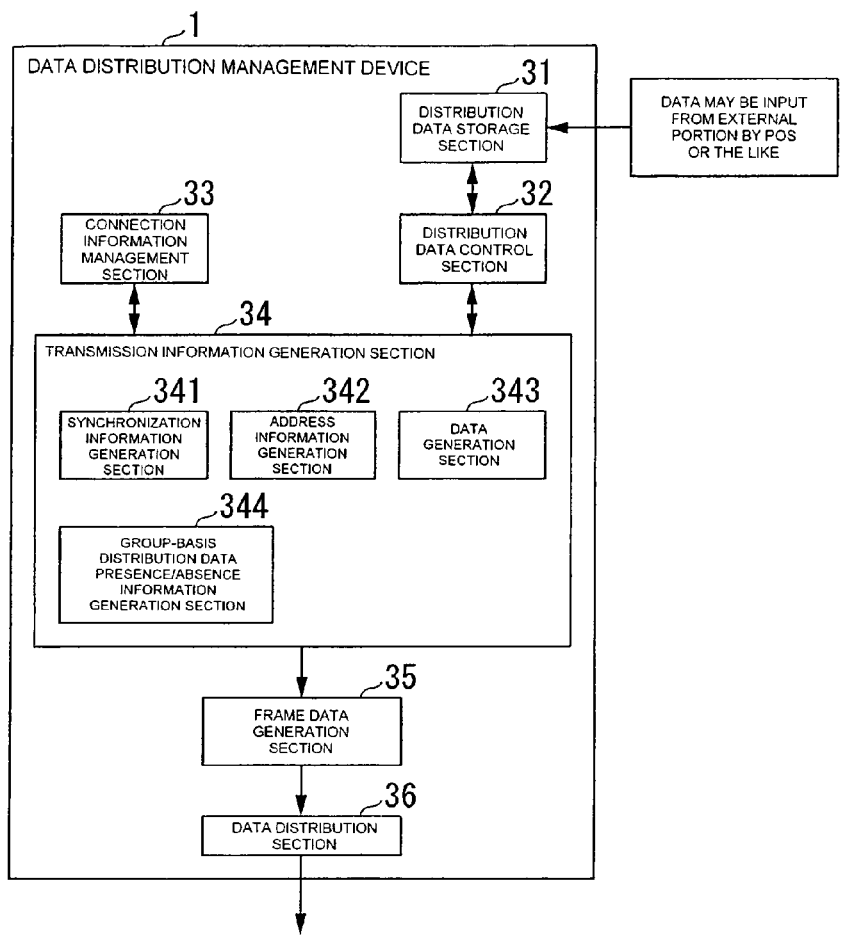
FIGS. 3 is a block diagram illustrating a functional configuration of the data distribution management device according to the first embodiment.

FIG. 3 is a block diagram illustrating a functional configuration of the data distribution management device 1 according to this embodiment. In the example illustrated in the figure, the data distribution management device 1 includes a distribution data storage section 31, a distribution data control section 32, a connection information management section 33, a transmission information generation section 34, a frame data generation section 35, and a data distribution section 36.

Further, the transmission information generation section 34 includes a synchronization information generation section 341, an address information generation section 342, a data generation section 343, and a group-basis distribution data presence/absence information generation section 344.

The distribution data storage section 31 stores information to be distributed to the reception devices 4. The distribution data control section 32 controls the information stored by the distribution data storage section 31. The connection information management section 33 manages information used for connection to the reception devices 4. The transmission information generation section 34 generates information to be transmitted to the reception devices 4. The frame data generation section 35 generates a frame based on the information generated by the transmission information generation section 34. The data distribution section 36 performs communications to the radio base station 2. The synchronization information generation section 341 generates synchronization information S described later. The address information generation section 342 generates address information A described later. The data generation section 343 generates data D described later. The group-basis distribution data presence/absence information generation section 344 generates distribution data presence/absence information H described later.

Figure 4:
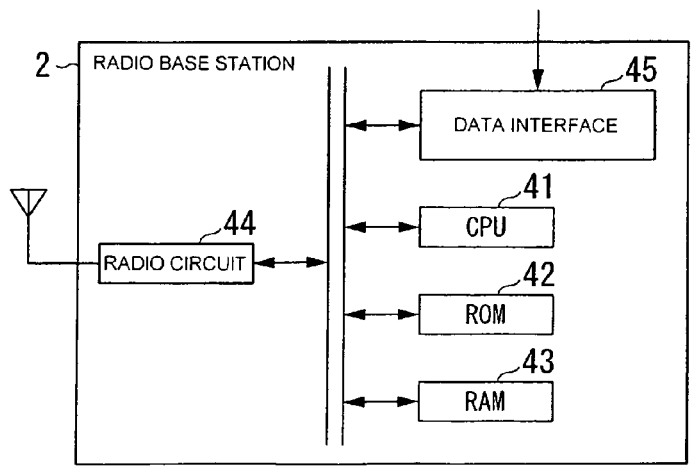
FIG. 4 is a block diagram illustrating a physical configuration of a radio base station according to the first embodiment.

FIG. 4 is a block diagram illustrating a physical configuration of the radio base station 2 according to this embodiment. In the example illustrated in the figure, the radio base station 2 includes a CPU 41, a ROM 42, a RAM 43, a radio circuit 44, and a data interface 45.

The CPU 41 carries out a processing of the radio base station 2. The ROM 42 and the RAM 43 store information used by the radio base station 2. The radio circuit 44 performs transmission/reception of information to/from another device by radio communication. The data interface 45 performs transmission/reception of information to/from another device.

Figure 5:
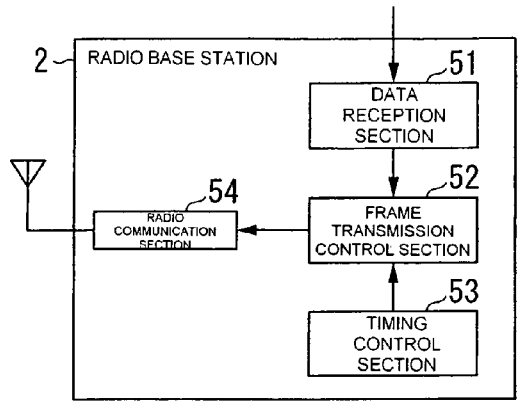
FIG. 5 is a block diagram illustrating a functional configuration of the radio base station according to the first embodiment.

FIG. 5 is a block diagram illustrating a functional configuration of the radio base station 2 according to this embodiment. In the example illustrated in the figure, the radio base station 2 includes a data reception section 51, a frame transmission control section 52, a timing control section 53, and a radio communication section 54.

The data reception section 51 performs communications to the data distribution management device 1. The frame transmission control section 52 controls transmission of the frame to the reception device groups 3-1 to 3-n. The timing control section 53 controls a timing to transmit information to the reception device groups 3-1 to 3-n. The radio communication section 54 performs communications to the reception device groups 3-1 to 3-n.

Figure 6:
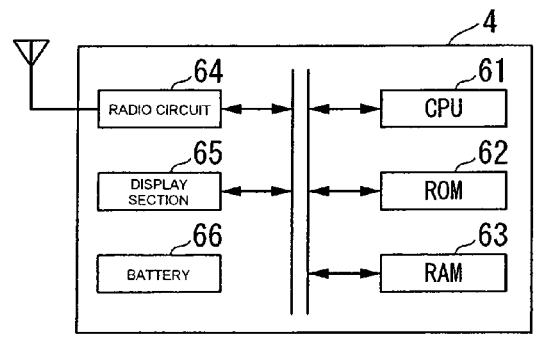
FIG. 6 is a block diagram illustrating a physical configuration of a reception device according to the first embodiment.

FIG. 6 is a block diagram illustrating a physical configuration of the reception device 4 according to this embodiment. In the example illustrated in the figure, the reception device 4 includes a CPU 61, a ROM 62, a RAM 63, a radio circuit 64, a display section 65, and a battery 66.

The CPU 61 carries out a processing of the reception device 4. The ROM 62 and the RAM 63 store information used by the reception device 4. The radio circuit 64 performs transmission/reception of information to/from another device by radiocommunication. The display section 65 is, for example, a liquid crystal panel or the like, and displays information therein. The battery 66 supplies the reception device 4 with power used thereby.

Figure 7:
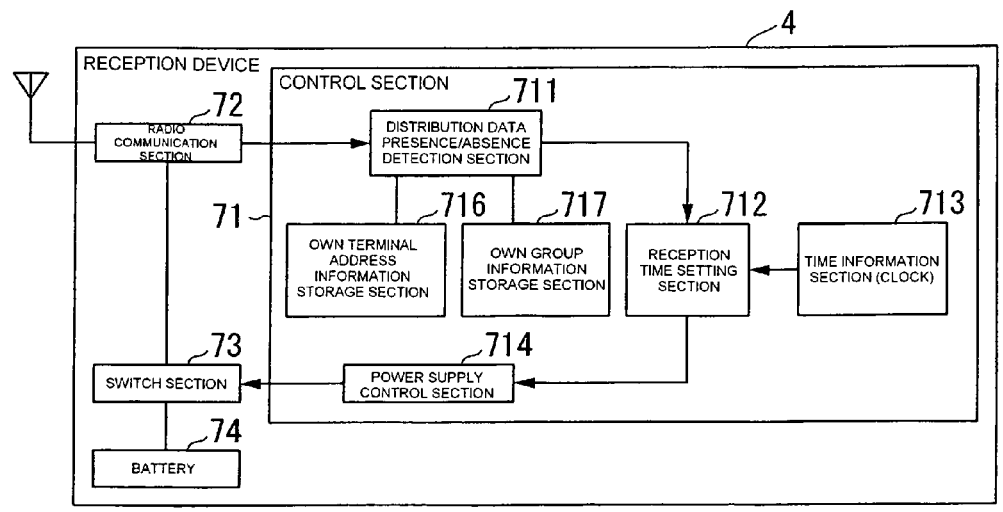
FIG. 7 is a block diagram illustrating a functional configuration of the reception device according to the first embodiment.

FIG. 7 is a block diagram illustrating a functional configuration of the reception device 4 according to this embodiment. In the example illustrated in the figure, the reception device 4 includes a control section 71, a radio communication section 72, a switch section 73, and a battery 74.

Further, the control section 71 includes a distribution data presence/absence detection section 711, a reception time setting section 712, a time information section 713, a power supply control section 714, an own terminal address information storage section 716, and an own group information storage section 717.

The control section 71 performs control of communications to the radio base station 2. The radio communication section 72 includes a radio circuit, and performs communications to the radio base station 2. The switch section 73 is a switch for a current flowing through the radio circuit of the radio communication section 72. The battery 74 supplies the reception device 4 with power used thereby. The distribution data presence/absence detection section 711 detects whether or not the data D is to be transmitted from the radio base station 2. The reception time setting section 712 sets a time to receive information transmitted from the radio base station 2. The time information section 713 generates a time (clock). The power supply control section 714 uses the switch section 73 to control the current flowing through the radio circuit of the radio communication section 72. The own terminal address information storage section 716 stores address information specific to the self. The own group information storage section 717 stores information on which of the reception device groups 3-1 to 3-n the self belongs to.

Figure 8:
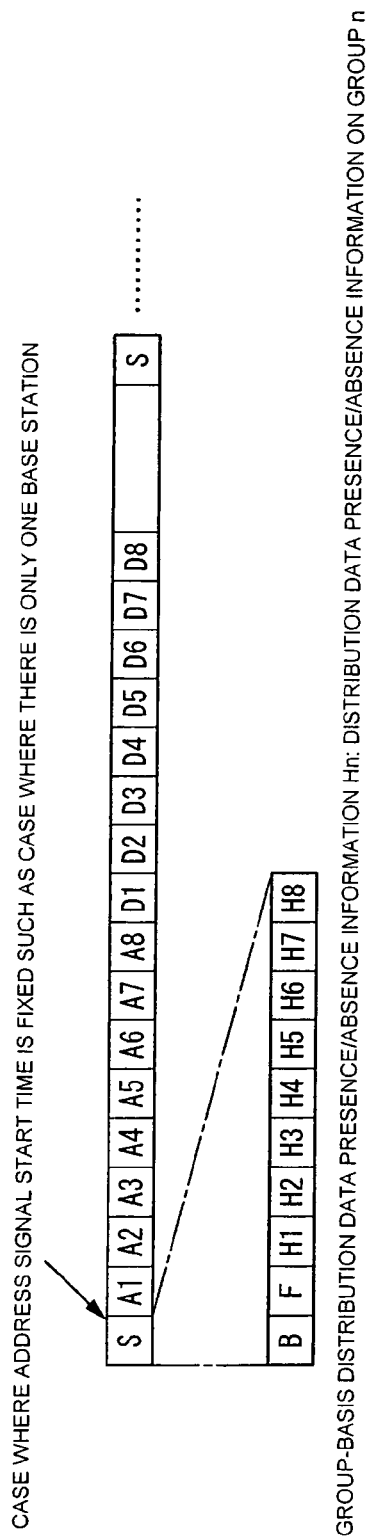
FIG. 8 is a structural diagram illustrating a structure of a frame according to the first embodiment.

Next described is a structure of a frame according to this embodiment. FIG. 8 is a structural diagram illustrating the structure of the frame according to this embodiment in a case where there are eight reception device groups 3 illustrated in FIG. 1. The frame includes the synchronization information S, the address information A, and the data D.

In the example illustrated in the figure, one frame includes the synchronization information S, group-specific address information items A1 to A8, and group-specific data items D1 to D8 in order. The group-specific address information items A1 to A8 and the group-specific data items D1 to D8 include address information and data for the individual reception devices 4 within the reception device group 3.

For example, the group-specific address information item A1 includes therein the address information directed to the individual reception devices 4 within a first reception device group 3. Further, the synchronization information includes bit synchronization information B, frame information F, and the distribution data presence/absence information H. In the example illustrated in the figure, one synchronization information item S includes the bit synchronization information B, the frame information F, and group-basis distribution data presence/absence information items H1 to H8 in order.

The synchronization information S is information formed of the bit synchronization information B, the frame information F, and the group-basis distribution data presence/absence information H. The bit synchronization information B is information for achieving synchronization between the radio base station 2 and the reception devices 4. The frame information F is information for informing the reception devices 4 of the information on this frame transmitted by the radio base station 2. For example, the frame information F is information including ID information on the radio base station 2 and cycle information of the frame, which is necessary for the reception device 4 to operate in synchronization with the radio base station 2.

The group-basis distribution data presence/absence information H is information indicating whether or not the data D to be transmitted to the respective reception device groups 3-1 to 3-n is included within this frame. For example, in a case where the group-specific data item D1 to be transmitted to the reception device group 3-1 is included in this frame, the group-basis distribution data presence/absence information item H1 is "1", and in a case where the group-specific data item D1 to be transmitted to the reception device group 3-1 is not included in this frame, the group-basis distribution data presence/absence information item H1 is "0". The same is true of the other reception device groups.

The group-specific address information A indicates an address of the reception device group 3 within this frame in which the group-specific data D is to be transmitted. The group-specific data D is data to be transmitted to the reception device group 3 indicated by the group-specific address information A within this frame. For example, in a case where the reception device group 3 is electronic shelf labels, the data D is the information including trade names and commodity prices.

Figure 9:
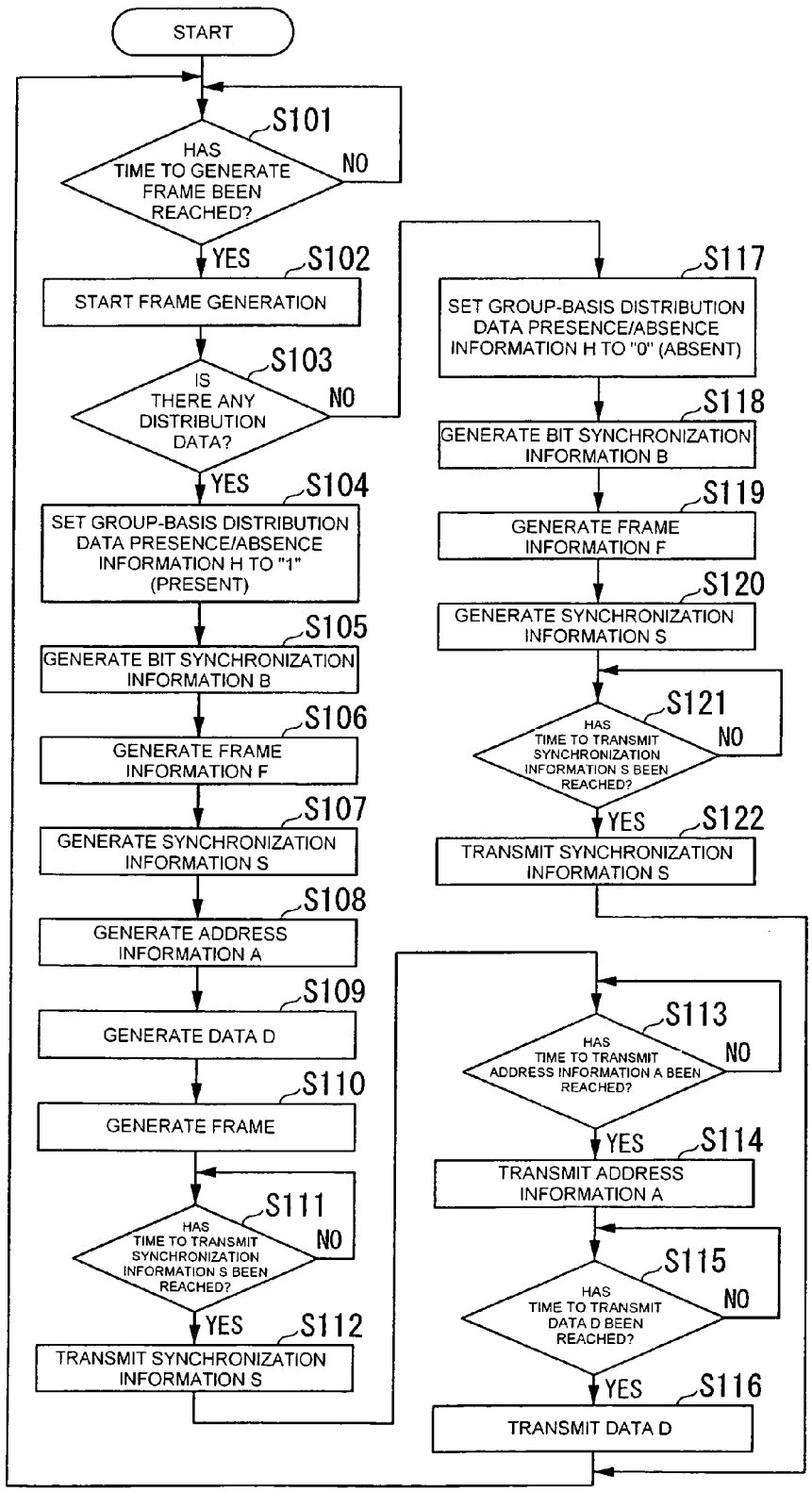
FIG. 9 is a flowchart illustrating procedures for operations of the data distribution management device and the radio base station according to the first embodiment.

Next described are operations of the data distribution management device 1 and the radio base station 2 according to this embodiment. FIG. 9 is a flowchart illustrating procedures for the operations of the data distribution management device 1 and the radio base station 2 according to this embodiment.

(Step S101) The connection information management section 33 of the data distribution management device 1 determines whether or not a time to generate a frame has been reached. If it is determined that the time to generate a frame has been reached, the procedure advances to Step S102, or otherwise returns to the processing of Step S101.

(Step S102) The frame data generation section 35 of the data distribution management device 1 starts to generate a frame. After that, the procedure advances to Step S103.

(Step S103) The distribution data control section 32 of the data distribution management device 1 determines whether or not there is data to be distributed in the distribution data storage section 31. If it is determined that there is data to be distributed, the procedure advances to Step S104, or otherwise advances to Step S117.

(Step S104) The group-basis distribution data presence/absence information generation section 344 of the data distribution management device 1 generates the group-basis distribution data presence/absence information H on the reception device groups 3-1 to 3-n. The values of the group-basis distribution data presence/absence information items H on the reception device groups 3-1 to 3-n for which there is data to be distributed are set to "1", while the values of the group-basis distribution data presence/absence information items H on the reception device groups 3-1 to 3-n for which there is no data to be distributed are set to "0". After that, the procedure advances to Step S105.

(Step S105) The synchronization information generation section 341 of the data distribution management device 1 generates the bit synchronization information B. After that, the procedure advances to Step S106.

(Step S106) The synchronization information generation section 341 of the data distribution management device 1 generates the frame information F. After that, the procedure advances to Step S107.

(Step S107) The synchronization information generation section 341 of the data distribution management device 1 generates the synchronization information S based on the distribution data presence/absence information H, the bit synchronization information B, and the frame information F that are generated in Step S104 to Step S106. After that, the procedure advances to Step S108.

(Step S108) The address information generation section 342 of the data distribution management device 1 generates the address information A. After that, the procedure advances to Step S109.

(Step S109) The data generation section 343 of the data distribution management device 1 generates the data D. After that, the procedure advances to Step S110.

(Step S110) The frame data generation section 35 of the data distribution management device 1 generates the frame based on the synchronization information S, the address information A, and the data D that are generated in Step S107 to Step S109. Further, the data distribution section 36 of the data distribution management device 1 transmits the generated frame to the radio base station 2. The data reception section 51 of the radio base station 2 receives the frame transmitted from the data distribution management device 1. After that, the procedure advances to Step S111.

(Step S111) The timing control section 53 of the radio base station 2 determines whether or not a time to transmit the synchronization information S has been reached. If it is determined that the time to transmit the synchronization information S has been reached, the procedure advances to Step S112, or otherwise returns to Step S111.

(Step S112) The frame transmission control section 52 of the radio base station 2 transmits the synchronization information S of the frame received in Step S110 to the reception devices 4 via the radio communication section 54. After that, the procedure advances to Step S113.

(Step S113) The timing control section 53 of the radio base station 2 determines whether or not a time to transmit the address information A has been reached. If it is determined that the time to transmit the address information A has been reached, the procedure advances to Step S114, or otherwise returns to Step S113.

(Step S114) The frame transmission control section 52 of the radio base station 2 transmits the address information A of the frame received in Step S110 to the reception devices 4 via the radio communication section 54. After that, the procedure advances to Step S115.

(Step S115) The timing control section 53 of the radio base station 2 determines whether or not a time to transmit the data D has been reached. If it is determined that the time to transmit the data D has been reached, the procedure advances to Step S116 or otherwise returns to Step S115

(Step S116) The frame transmission control section 52 of the radio base station 2 transmits the data D of the frame received in Step S110 to the reception devices 4 via the radio communication section 54. After that, the procedure returns to Step S101.

(Step S117) The group-basis distribution data presence/absence information generation section 344 of the data distribution management device 1 generates the group-basis distribution data presence/absence information H on the reception device groups 3-1 to 3-*n*. It is determined in Step S103 that there is no data to be distributed, and hence the values of the group-basis distribution data presence/absence information items H on the reception device groups 3-1 to 3-*n* are set to "0". After that, the procedure advances to Step S118.

(Step S118) The synchronization information generation section 341 of the data distribution management device 1 generates the bit synchronization information B. After that, the procedure advances to Step S119.

(Step S119) The synchronization information generation section 341 of the data distribution management device 1 generates the frame information F. After that, the procedure advances to Step S120.

(Step S120) The synchronization information generation section 341 of the data distribution management device 1 generates the synchronization information S based on the group-basis distribution data presence/absence information H, the bit synchronization information B, and the frame information F that are generated in Step S117 to Step S119. Further, the data distribution section 36 of the data distribution management device 1 transmits the generated synchronization information S to the radio base station 2. The data reception section 51 of the radio base station 2 receives the synchronization information S transmitted from the data distribution management device 1. After that, the procedure advances to Step S121.

(Step S121) The timing control section 53 of the radio base station 2 determines whether or not a time to transmit the synchronization information S has been reached. If it is determined that the time to transmit the synchronization information S has been reached, the procedure advances to Step S122, or otherwise returns to Step S121.

(Step S122) The frame transmission control section 52 of the radio base station 2 transmits the synchronization information S received in Step S120 to the reception devices 4 via the radio communication section 54. After that, the procedure returns to Step S101.

As described above, the data distribution management device 1 according to this embodiment can generate the group-basis distribution data presence/absence information H on the reception device groups 3-1 to 3-*n* and can generate the synchronization information S including the generated group-basis distribution data presence/absence information H. Further, the radio base station 2 according to this embodiment can transmit the synchronization information S including the group-basis distribution data presence/absence information H on the reception device groups 3-1 to 3-*n* to the reception devices 4.

Figure 10:
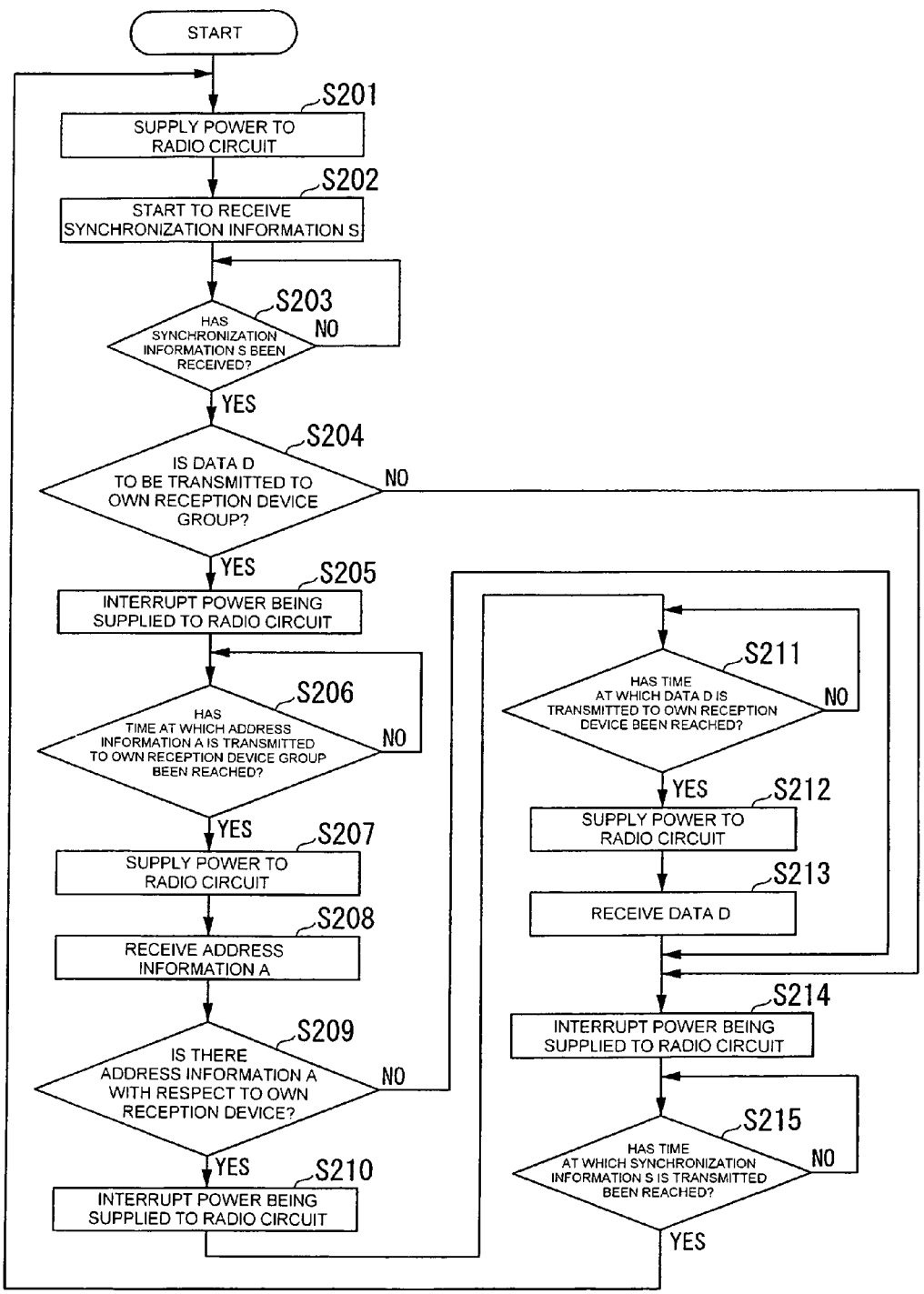
FIG. 10 is a flowchart illustrating a procedure for an operation of the reception device according to the first embodiment.

Next described is an operation of the reception device 4 according to this embodiment. FIG. 10 is a flowchart illustrating a procedure for the operation of the reception device 4 according to this embodiment.

(Step S201) The power supply control section 714 of the reception device 4 controls the switch section 73 to supply power to the radio circuit of the radio communication section 72. After that, the procedure advances to Step S202.

(Step S202) The radio communication section 72 of the reception device 4 starts to receive the synchronization information S transmitted from radio base station 2. After that, the procedure advances to Step S203.

(Step S203) The distribution data presence/absence detection section 711 of the reception device 4 determines whether or not the radio communication section 72 has received the synchronization information S.

If it is determined that the synchronization information S has been received, the procedure advances to Step S204, or otherwise returns to Step S203.

(Step S204) The distribution data presence/absence detection section 711 of the reception device 4 determines whether or not the data D is to be transmitted from the radio base station 2 to the reception device groups 3-1 to 3-*n* to which the reception device itself belongs, based on the distribution data presence/absence information H included in the synchronization information S received by the radio communication section 72.

Specifically, if the value of the distribution data presence/absence information H on the reception device groups 3-1 to 3-*n* to which the own reception device belongs is "1", the reception device 4 determines that the data D is to be transmitted thereafter from the radio base station 2 to the reception device group to which the self belongs, and the procedure advances to Step S205. If the value of the distribution data presence/absence information H on the reception device groups 3-1 to 3-*n* to which the own reception device belongs is "0", it is determined that the data D is not to be transmitted thereafter from the radio base station 2 to the reception device group to which the own reception device belongs, and the procedure advances to Step S214.

(Step S205) After reception of the synchronization information S, the power supply control section 714 of the reception device 4 controls the switch section 73 to interrupt the power being supplied to the radio circuit of the radio communication section 72. After that, the procedure advances to Step S206.

(Step S206) The reception time setting section 712 of the reception device 4 determines whether or not a time at which the address information A is transmitted to the reception device groups 3-1 to 3-*n* to which the reception device 4 itself belongs from radio base station 2 has been reached. If it is determined that the time for the transmission has been reached, the procedure advances to Step S207, or otherwise returns to Step S206.

(Step S207) The power supply control section 714 of reception device 4 controls the switch section 73 to supply power to the radio circuit of the radio communication section 72. In this embodiment, a time (timing) at which the address information A is transmitted is fixed, and the timing at which the address information A is transmitted is immediately after completion of the transmission of the synchronization information S. Therefore, the group-specific address information item An within the address information A is transmitted in order of the group number as illustrated in FIG. 8, and hence the reception device 4 controls the switch section 73 in synchronization with a transmission timing for the address information item An transmitted to the self. After that, the procedure advances to Step S208.

(Step S208) The radio communication section 72 of the reception device 4 receives the address information A transmitted from the radio base station 2. After that, the procedure advances to Step S209.

(Step S209) The distribution data presence/absence detection section 711 of the reception device 4 determines whether or not the address information A addressed to the self is included in the address information A received in Step S208. If it is determined that the address information A is included, the procedure advances to Step S210, or otherwise advances to Step S214.

(Step S210) The power supply control section 714 of the reception device 4 controls the switch section 73 to interrupt the power being supplied to the radio circuit of the radio communication section 72. After that, the procedure advances to Step S211.

(Step S211) The reception time setting section 712 of the reception device 4 determines whether or not a time at which the data D is transmitted from the radio base station 2 to the own reception device 4 has been reached. If it is determined that the time for the transmission has been reached, the procedure advances to Step S212, or otherwise returns to Step S211.

(Step S212) The power supply control section 714 of the reception device 4 controls the switch section 73 to supply power to the radio circuit of the radio communication section 72. The group-specific data item Dn within the data D is transmitted in order of the group number as illustrated in FIG. 8, and hence the switch section 73 is controlled in synchronization with a transmission timing for the data D addressed to the own reception device. After that, the procedure advances to Step S213.

(Step S213) The radio communication section 72 of the reception device 4 receives the data D transmitted from the radio base station 2. After that, the procedure advances to Step S214.

(Step S214) After reception of the data D addressed to the own reception device, the power supply control section 714 of the reception device 4 controls the switch section 73 to interrupt the power being supplied to the radio circuit of the radio communication section 72. After that, the procedure advances to Step S215.

(Step S215) The reception time setting section 712 of the reception device 4 determines whether or not a time at which the synchronization information S is transmitted from the radio base station 2 has been reached. If it is determined that the time for the transmission has been reached, the procedure returns to Step S201, or otherwise returns to Step S215.

Note that, in this flowchart, with regard to the timing to interrupt the power supply to the radio circuit, there are a method in which transmission time periods for the synchronization information S, the address information A, and the data D are previously set and the interruption is performed at a point in time when the set period has elapsed after the reception, a method in which end bits indicating the end of transmission are added to the synchronization information S, the address information A, and the data D and the interruption is performed at a point in time when the reception of the end bit is detected, and other such methods.

Figure 11:
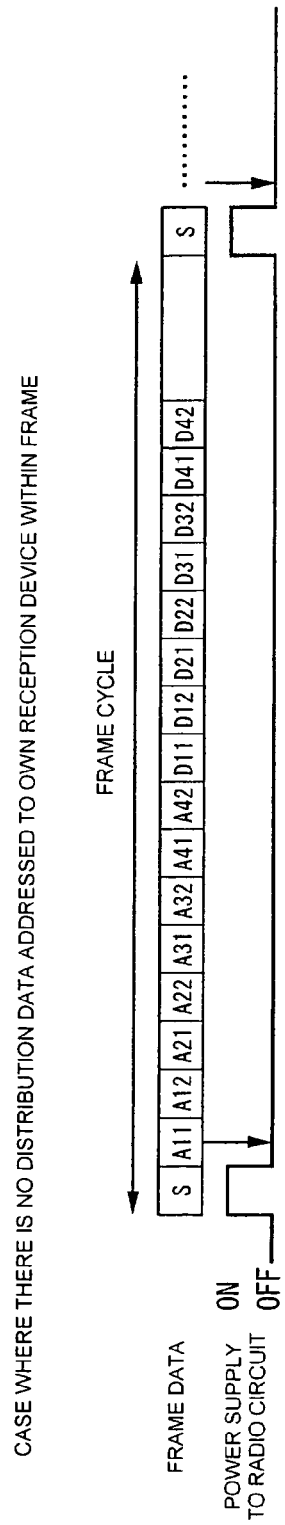
FIG. 11 is a diagram illustrating on/off timings of power supplied to a radio circuit of the reception device according to the first embodiment.

FIG. 11 is referenced to describe a specific example of on/off timings of power supplied to the radio circuit of the reception device 4 in a case where the data D to be transmitted to the own reception device groups 3-1 to 3-$n$ is not included in the frame (the data D is not to be transmitted from the radio base station 2 to the own reception device groups 3-1 to 3-$n$).

Figure 12:
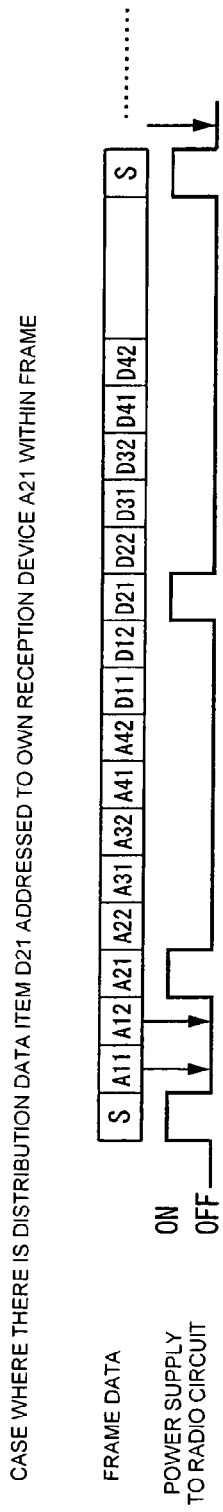
FIG. 12 is a diagram illustrating on/off timings of the power supplied to the radio circuit of the reception device according to the first embodiment.

FIG. 11 and FIG. 12 are diagrams illustrating the on/off timings of the power supplied to the radio circuit of the reception device 4 according to this embodiment. The frame data illustrated in FIG. 11 indicates a frame structure in a system formed of four reception device groups 3 illustrated in FIG. 1 and two reception devices 4 included in each of the reception device groups. Here, respectively, A11 and A12 are individual address information items with respect to the reception devices 4 within a first group, A21 and A22 are address information items with respect to the individual reception devices 4 within a second group, A31 and A32 are address information items with respect to the individual reception devices 4 within a third group, A41 and A42 are address information items with respect to the individual reception devices 4 within a fourth group, D11 and D12 are data items with respect to the individual reception devices 4 within the first group, D21 and D22 are data items with respect to the individual reception devices 4 within the second group, D31 and D32 are data items with respect to the individual reception devices 4 within the third group, and D41 and D42 are data items with respect to the individual reception devices 4 within the fourth group.

Further, FIG. 11 illustrates a power supply state of the radio circuit within the radio communication section 72 of the reception device 4 corresponding to the address information item A21 within the second reception device group, and illustrates the on/off timings of the power supplied to the radio circuit within the radio communication section 72 of the reception device 4 in a case where the data D to be transmitted to the reception device group 3 is absent from the frame (the data D is not to be transmitted from the radio base station 2 to the own reception device group 3).

In the example illustrated in the figure, the power is supplied to the radio circuit of the reception device 4 at timings at which the synchronization information S within the frame is transmitted from the radio base station 2. Here, if the value of the group-basis distribution data presence/absence information item H2 on the second reception device group 3 is "0", the power is not supplied to the radio circuit of the reception device 4 in a time period other than the timings at which the synchronization information S within the frame is transmitted from the radio base station 2.

FIG. 12 illustrates a case where the data D to be transmitted to the second reception device group 3-2 is included in the frame (the data D is to be transmitted from the radio base station 2 to the reception device group 3-2), and illustrates the state of the power being supplied to the radio circuit within the radio communication section 72 of the reception device 4 corresponding to the address information item A21 within the second reception device group 3-2.

In the example illustrated in FIG. 12, the power is supplied to the radio circuit within the radio communication section 72 of the reception device 4 at a timing at which the synchronization information S within the frame is transmitted from the radio base station 2. Here, if the value of the group-basis distribution data presence/absence information item H2 on the reception device group 3-2 is "1", the radio circuit of the reception device 4 within the reception device group 3-2 has the power supply interrupted temporarily. After that, the power is supplied to the radio circuit of the reception device 4 corresponding to the address information item A21 at a timing at which the address information item A21 addressed to the reception device 4 within the reception device group 3-2 is transmitted from the radio base station 2. Here, if the address information item A21 with respect to the self is confirmed in the reception device 4, the power supply is again interrupted, and then, the power is again supplied to the radio circuit of the reception device 4 at a timing at which the data item D21 addressed to the own reception device is transmitted from the radio base station 2.

In the above-mentioned example, the power is kept from being supplied to the radio circuit of the reception device 4 until the transmission of the address information item A21 addressed to the individual reception device 4 is started after the transmission of the synchronization information S within the frame is completed. Further, after the transmission of the address information item A21 within the frame is completed, the power is kept from being supplied to the radio circuit of the reception device 4 until the transmission of the data item D21 addressed to the own reception device is started. Further, after the transmission of the data item D21 within the frame is completed, the power is kept from being supplied to the radio circuit of the reception device 4 until the transmission of the subsequent synchronization information S.

As described above, the reception device 4 according to this embodiment receives the synchronization information S including the group-basis distribution data presence/absence information H on the reception device groups 3-1 to 3-n, and determines whether or not the data D is to be transmitted to the own reception device groups 3-1 to 3-n based on the received group-basis distribution data presence/absence information H, and if it is determined that the transmission is not to be performed, the power supply control section 714 interrupts the power being supplied to the radio circuit of the radio communication section 72. This can further reduce the power consumption caused by the reception device 4. Further, the battery provided to the reception device 4 can be made to last longer.

Further, by dividing the reception devices into a plurality of groups, it becomes unnecessary for the own reception device to receive the address information used for distributing the data addressed to the reception device belonging to another group performing communications to the same radio base station, which can shorten the operation time period for the radio circuit. This can further reduce the power used by the reception device. Accordingly, the battery provided to the reception device can be made to last much longer.

(Second Embodiment)

Figure 13:
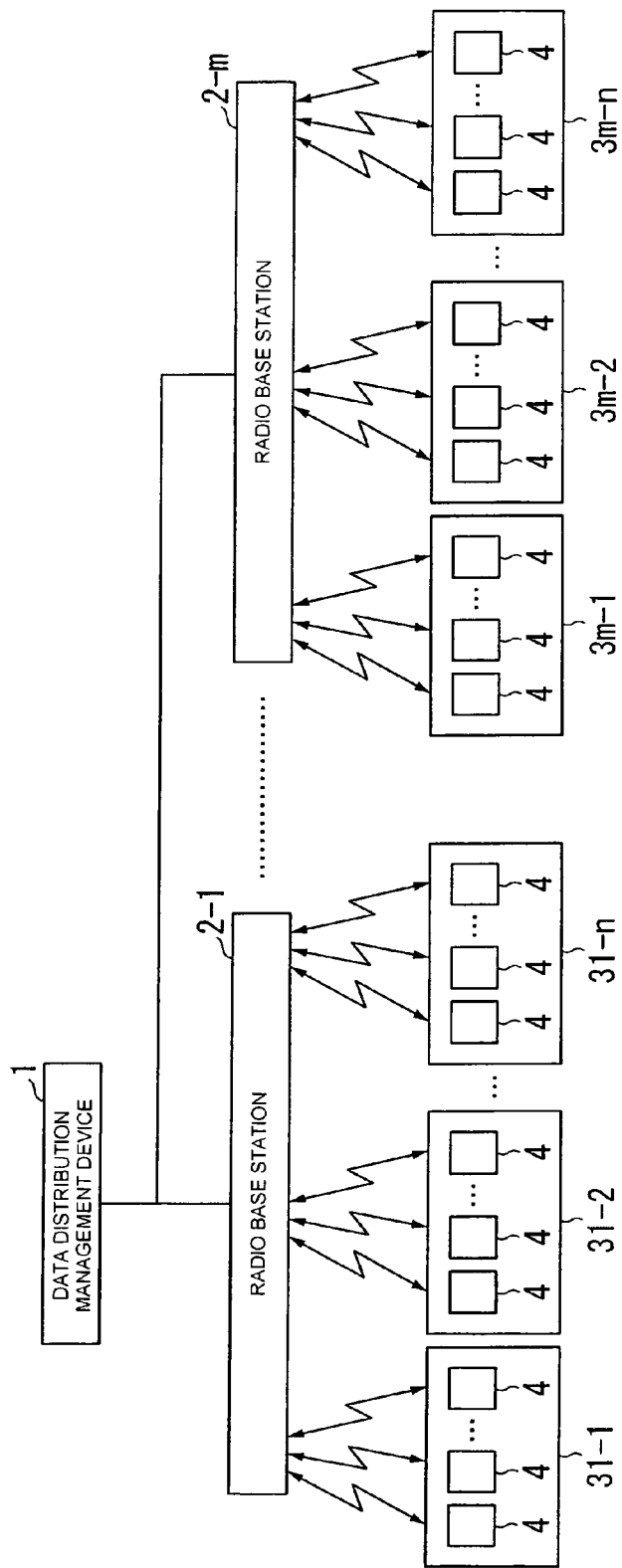
FIG. 13 is a structural diagram illustrating a structure of a data transmission/reception system according to a second embodiment.

Next, a second embodiment of the present invention is described with reference to the drawings. FIG. 13 is a structural diagram illustrating a structure of a data transmission/reception system according to this embodiment. In the example illustrated in the figure, the data transmission/reception system includes the data distribution management device 1 (frame generation device), the radio base stations 2-1 to 2-m (transmission device), and reception device groups 31-1 to 3m-n. The reception device groups 31-1 to 3m-n each include one or a plurality of reception devices 4.

The data distribution management device 1 and the radio base stations 2-1 to 2-m are connected to each other by a wired or wireless network, and can transmit/receive information to/from each other. Further, the radio base stations 2-1 to 2-m are connected to the one or the plurality of reception devices 4 by wireless networks, and can transmit/receive information to/from each other. In the example illustrated in the figure, the radio base station 2-1 is connected to the reception devices 4 included in the reception device groups 31-1 to 31-n by wireless networks, and can transmit/receive information to/from each other. The other radio base station 2-m is also connected to the reception devices 4 included in the reception device groups 3m-1 to 3m-n by wireless networks.

The data distribution management device 1 generates a frame to be transmitted to the reception devices 4 via the radio base stations 2-1 to 2-m. The frame is described later. Further, the data distribution management device 1 manages a timing at which the created frame is transmitted to the reception devices 4.

The radio base stations 2-1 to 2-m transmit to the reception devices 4 the frame transmitted from the data distribution management device 1. The reception devices 4 receive information included in the frame transmitted from the data distribution management device 1 via the radio base stations 2-1 to 2-m.

Note that, the data transmission/reception system according to this embodiment is, for example, an electronic shelf label system in the same manner as in the first embodiment. Specifically, the reception devices 4 are electronic shelf labels each provided with a display section, and the data distribution management device 1 transmits information including trade names and commodity prices to be displayed in the display sections of the reception devices 4 to the reception devices 4 via the radio base stations 2-1 to 2-m. Meanwhile, each of the reception devices 4 that have received the information including trade names and commodity prices transmitted from the data distribution management device 1 displays a trade name, a commodity price, and the like in its own display section based on the received information including trade names and commodity prices.

The physical configuration of the data distribution management device 1 according to this embodiment is the same as the physical configuration of the data distribution management device 1 according to the first embodiment.

Figure 14:
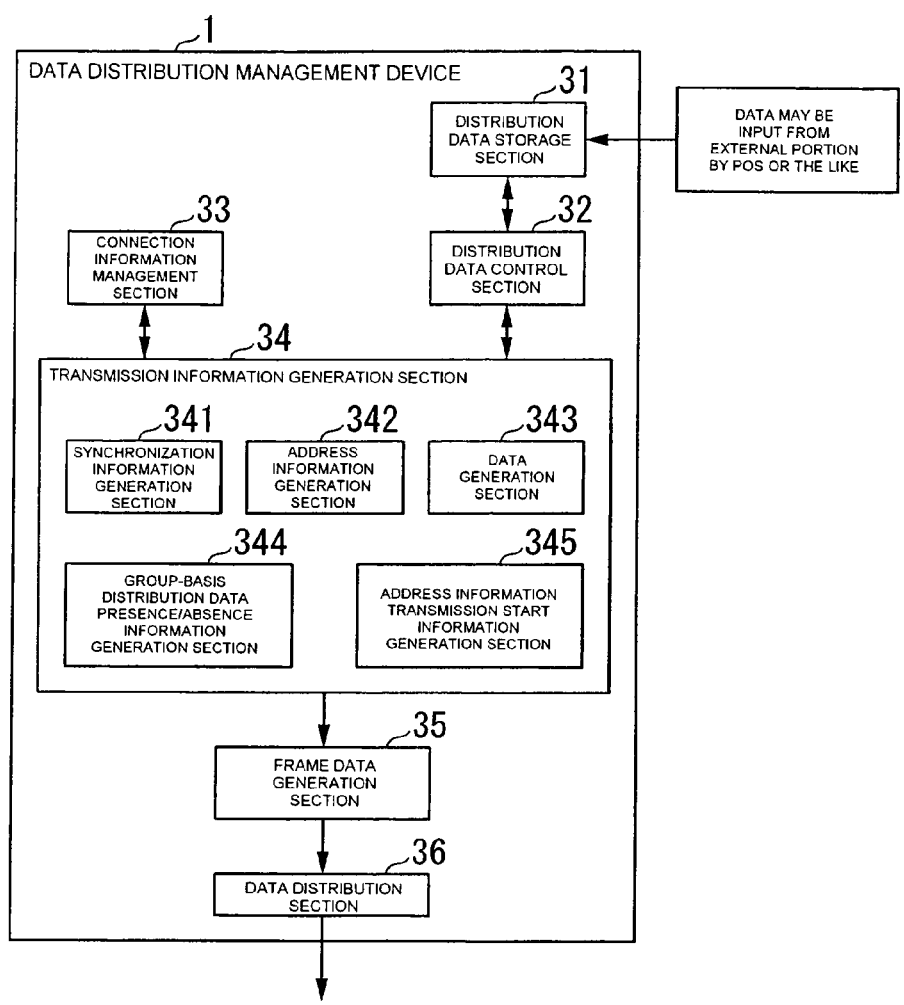
FIG. 14 is a block diagram illustrating a functional configuration of a data distribution management device according to the second embodiment.

FIG. 14 is a block diagram illustrating a functional configuration of the data distribution management device 1 according to this embodiment. In the example illustrated in the figure, the data distribution management device 1 includes the distribution data storage section 31, the distribution data control section 32, the connection information management section 33, the transmission information generation section 34, the frame data generation section 35, and the data distribution section 36.

Further, the transmission information generation section 34 includes the synchronization information generation section 341, the address information generation section 342, the data generation section 343, the group-basis distribution data presence/absence information generation section 344, and an address information transmission start information generation section 345.

The distribution data storage section 31, the distribution data control section 32, the connection information management section 33, the transmission information generation section 34, the frame data generation section 35, the data distribution section 36, the synchronization information generation section 341, the address information generation section 342, the data generation section 343, and the group-basis distribution data presence/absence information generation section 344 are the same as the respective sections according to the first embodiment. The address information transmission start information generation section 345 generates address information transmission start information At described later.

The physical configurations of the radio base station 2 according to this embodiment are the same as the physical configurations of the radio base station 2 according to the first embodiment.

Figure 15:
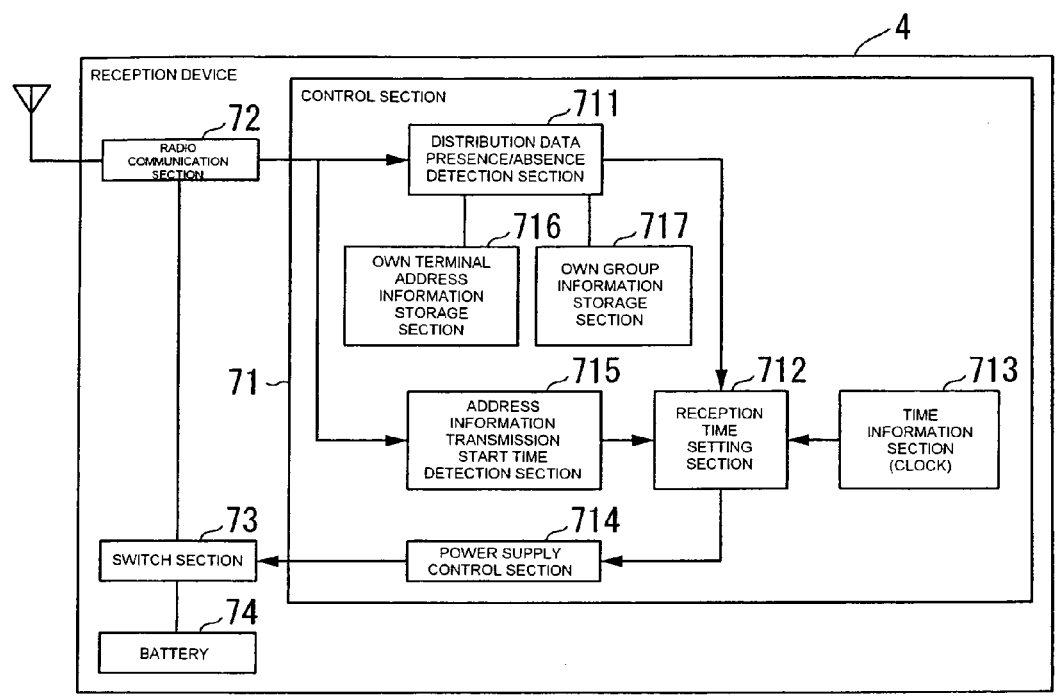
FIG. 15 is a block diagram illustrating a functional configuration of a reception device according to the second embodiment.

FIG. 15 is a block diagram illustrating a functional configuration of the reception device 4 according to this embodiment. In the example illustrated in the figure, the reception device 4 includes the control section 71, the radio communication section 72, the switch section 73, and the battery 74.

Further, the control section 71 includes the distribution data presence/absence detection section 711, the reception time setting section 712, the time information section 713, the power supply control section 714, an address information transmission start time detection section 715, an own terminal address information storage section 716, and an own group information storage section 717.

The control section 71, the radio communication section 72, the switch section 73, the battery 74, the distribution data presence/absence detection section 711, the reception time setting section 712, the time information section 713, and the power supply control section 714 are the same as the respective sections according to the first embodiment. The address information transmission start time detection section 715 detects a time at which the address information A with respect to the reception device groups 31-1 to 3$m$-$n$ to which the own reception device belongs is transmitted from the radio base stations 2-1 to 2-$m$. The own terminal address information storage section 716 stores the address information specific to the self. The own group information storage section 717 stores the information on which of the reception device groups 31-1 to 3$m$-$n$ the self belongs to.

Figure 16:
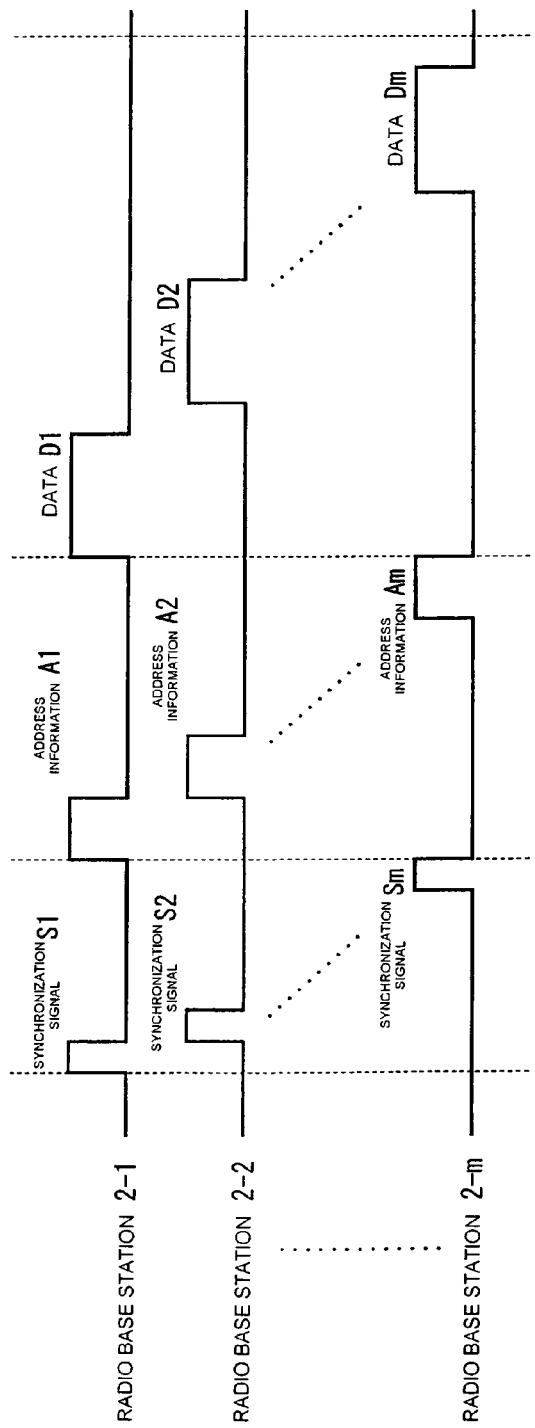
FIG. 16 is a diagram illustrating timings at which radio base stations transmit information according to the second embodiment.

In this embodiment, there exist a plurality of radio base stations 2 as illustrated in FIG. 13, and hence the radio base stations 2-1 to 2-$m$ transmit respective information items to the reception devices 4 of the corresponding reception device groups 31-1 to 3$m$-$n$ without an overlap therebetween. FIG. 16 is a diagram illustrating timings at which the radio base stations 2-1 to 2-$m$ transmit information. In the example illustrated in the figure, after the radio base station 2-1 transmits a synchronization information item S1 with respect to the reception device groups 31-1 to 31-$n$, the radio base station 2-2 then transmits a synchronization information item S2 with respect to the reception device groups 32-1 to 32-$n$ at a timing that does not overlap with a synchronization signal S1.

After all the radio base stations 2 have transmitted the synchronization information S in order and after the last radio base station 2-$m$ has transmitted a synchronization signal Sm with respect to the reception device groups 3$m$-1 to 3$m$-$n$, the respective radio base stations 2-1 to 2-$m$ transmit address information items A1 to Am addressed to the respective reception device groups 3 in order at timings that do not overlap with one another.

After all the radio base stations 2 have transmitted the address information A in order and after the last radio base station 2-$m$ has transmitted an address signal Am, the respective radio base stations 2-1 to 2-$m$ transmit data items D1 to Dm addressed to the respective reception device groups 3 in order at timings that do not overlap with one another. The control of the transmission of those information signals is performed by the data distribution management device 1.

Figure 17:
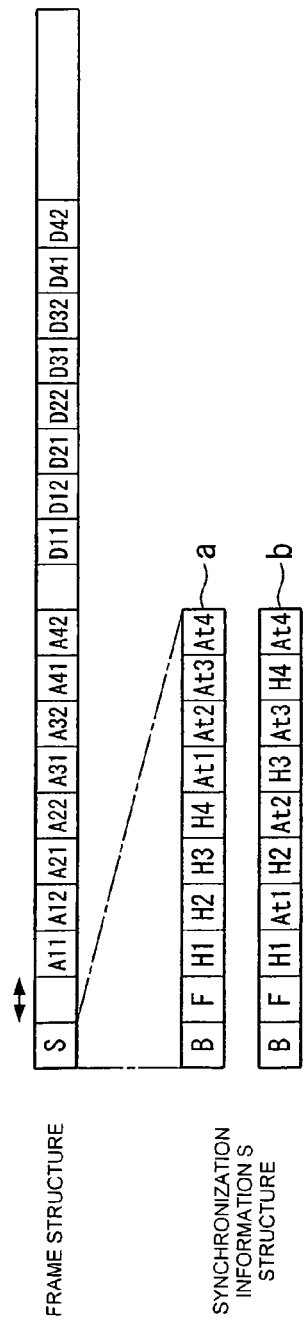
FIG. 17 is a structural diagram illustrating a structure of a frame according to the second embodiment.

Next described is a structure of a frame according to this embodiment. FIG. 17 is a structural diagram illustrating the structure of the frame transmitted by the radio base station 2-1 of FIG. 13 according to this embodiment in a case where there are four reception device groups 31 that communicate to the radio base station 2-1. The frame includes the synchronization information S, the address information A, and the data D.

In the example illustrated in the figure, one frame includes the synchronization information S, address information items A11 to A42 with respect to the individual reception devices 4 within the respective reception device groups 31, and data items D11 to D42 with respect to the individual reception devices 4 in order. The individual address information items A11 to A42 and the individual data items D11 to D42 are respectively transmitted to the first reception device group 31-1 in the case of A11, A12, D11, and D12, to the second reception device group 31-2 in the case of A21, A22, D21, and D22, to the third reception device group in the case of A31, A32, D31, and D32, and to the fourth reception device group in the case of A41, A42, D41, and D42.

Further, in this embodiment, there are intervals between the completion of the transmission of the synchronization information S and the start of the transmission of the address information A, between the completion of the transmission of the address information A and the start of the transmission of the data D, and between the completion of the transmission of the data D and the start of the transmission of the subsequent synchronization information S.

Those intervals are set for the transmission/reception of a plurality of synchronization information items S2 to Sm transmitted by the plurality of radio base stations 2-2 to 2-$m$ other than the radio base station 2-1 and for the transmission/reception of address information items A2 to Am addressed to a plurality of reception device groups 32-1 to 3$m$-$n$ other than the reception device groups 31-1 to 31-$n$ within the data transmission/reception system illustrated in FIG. 13. The interval varies according to the number of installed radio base stations 2 and the number of set reception device groups 3.

Further, as illustrated in FIG. 17, the synchronization information S includes the bit synchronization information B, the frame information F, the group-basis distribution data presence/absence information H, and the address information transmission start information At. In the example illustrated in the figure, there are two structural examples a and b of the synchronization information S, and the example a includes the address information transmission start information At after all the group-basis distribution data presence/absence information items H. Meanwhile, the example b alternately includes the group-basis distribution data presence/absence information items H and the address information transmission start information items At. Any one of the examples may be employed.

The bit synchronization information B is information for achieving synchronization between the radio base stations 2-1 to 2-$m$ and the reception devices 4. The frame information F is information for informing the reception devices 4 of the information on this frame transmitted by the radio base stations 2-1 to 2-$m$. For example, the frame information F is information including ID information on the radio base stations 2-1 to 2-$m$ and cycle information of the frame, which is necessary for the reception device 4 to operate in synchronization with the radio base stations 2-1 to 2-$m$.

The address information transmission start information At is information indicating a timing at which the transmission of the address information A to be transmitted to the respective reception device groups 31-1 to 3$m$-$n$ within the frame is started.

The group-basis distribution data presence/absence information H is information indicating whether or not the data D to be transmitted to the respective reception device groups 31-1 to 3m-n is included within this frame. For example, in a case where the data item D1 to be transmitted to the reception device group 31-1 is included in this frame, the group-basis distribution data presence/absence information item H1 is "1", and in a case where the data item D1 to be transmitted to the reception device group 31-1 is not included in this frame, the group-basis distribution data presence/absence information item H1 is "0". The same is true of the other reception device groups.

The address information items A11 to A42 indicate addresses within this frame to which the data items D are to be transmitted. The data items D11 to D42 are data to be transmitted to the reception device 4. For example, in a case where the reception device 4 is an electronic shelf label, the data D is the information including trade names and commodity prices.

Figure 18:
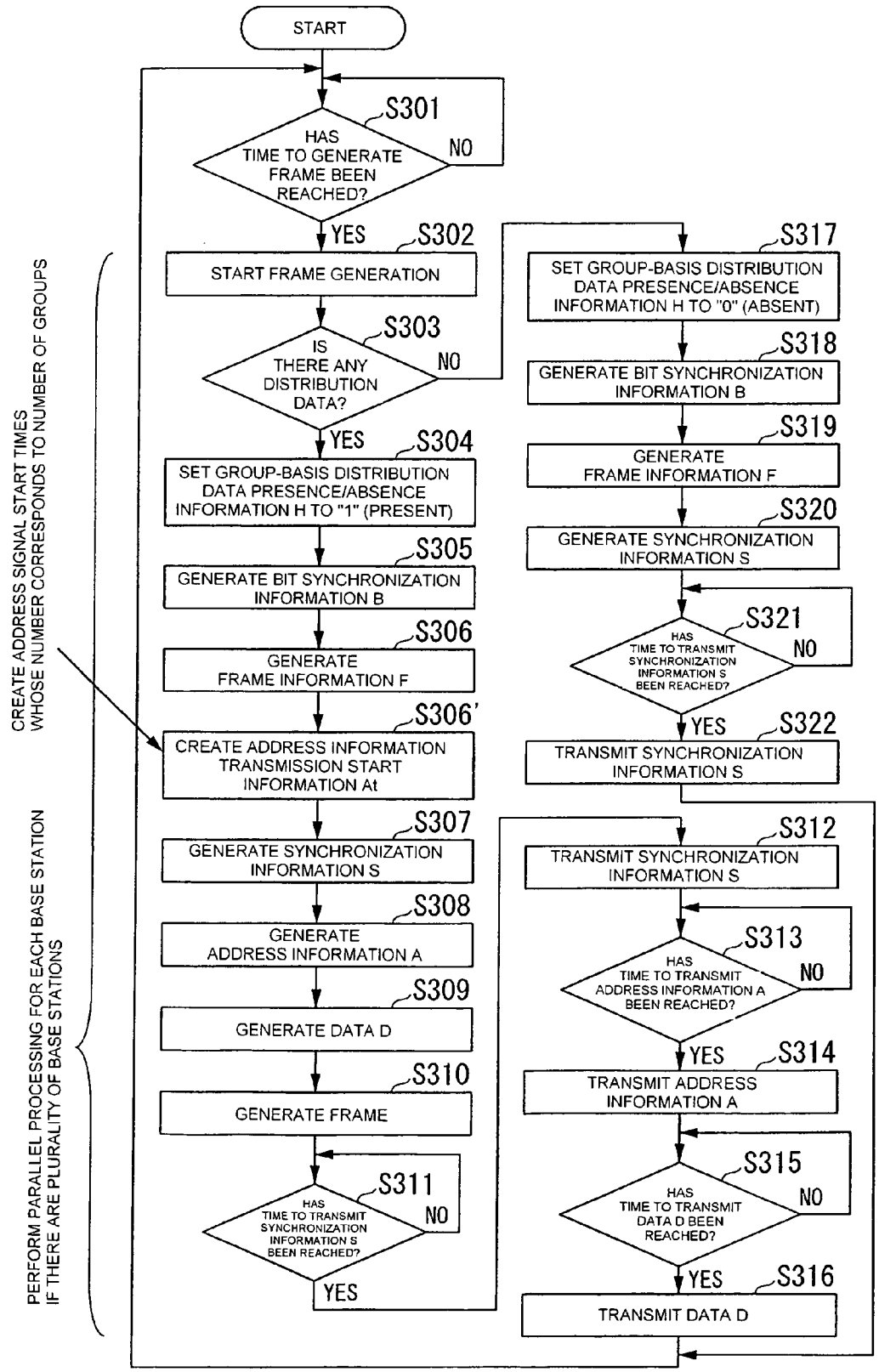
FIG. 18 is a flowchart illustrating procedures for operations of the data distribution management device and the radio base station according to the second embodiment.

Next described are operations of the data distribution management device 1 and the radio base stations 2-1 to 2-m according to this embodiment. FIG. 18 is a flowchart illustrating procedures for the operations of the data distribution management device 1 and the radio base stations 2-1 to 2-m according to this embodiment.

The processing of Step S301 to Step S306 is the same as the processing of Step S101 to Step S106 according to the first embodiment.

(Step S306') The address information transmission start information generation section 345 of the data distribution management device 1 generates the address information transmission start information At indicating a time at which the address information A is transmitted to the reception device groups 31-1 to 3m-n for each of the reception device groups 31-1 to 3m-n. After that, the procedure advances to Step S307.

(Step S307) The synchronization information generation section 341 of the data distribution management device 1 generates the synchronization information S based on the group-basis distribution data presence/absence information H, the bit synchronization information B, the frame information F, and the address information transmission start information At that are generated in Step S304 to Step S306'. After that, the procedure advances to Step S308.

The processing of Step S308 to Step S322 is the same as the processing of Step S108 to Step S122 according to the first embodiment.

As described above, the data distribution management device 1 according to this embodiment can generate the address information transmission start information At indicating the time at which the address information A is transmitted for each of the reception device groups 31-1 to 3m-n, and can generate the synchronization information S including the generated address information transmission start information At. Further, the radio base stations 2-1 to 2-m according to this embodiment can transmit the synchronization information S including the address information transmission start information At to the reception devices 4.

Figure 19:
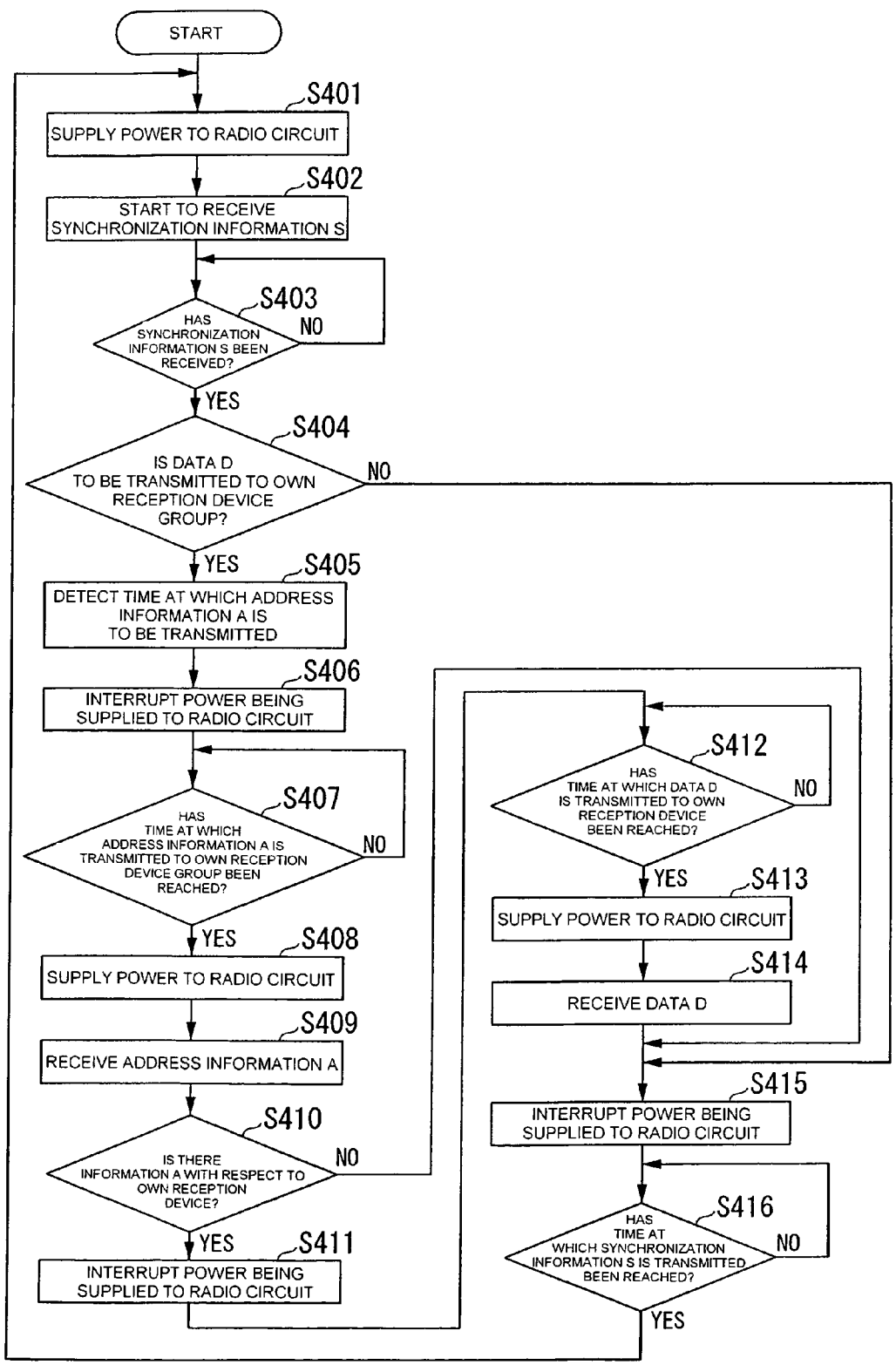
FIG. 19 is a flowchart illustrating a procedure for an operation of the reception device according to the second embodiment.

Next described is an operation of the reception device 4 according to this embodiment. FIG. 19 is a flowchart illustrating a procedure for the operation of the reception device 4 according to this embodiment.

(Step S401) The power supply control section 714 of the reception device 4 controls the switch section 73 to supply power to the radio circuit of the radio communication section 72 in synchronization with the transmission of the synchronization information S addressed to the own reception device. After that, the procedure advances to Step S402.

(Step S402) The radio communication section 72 of the reception device 4 starts to receive the synchronization information S transmitted from radio base stations 2-1 to 2-m. After that, the procedure advances to Step S403.

(Step S403) The distribution data presence/absence detection section 711 of the reception device 4 determines whether or not the radio communication section 72 has received the synchronization information S. If it is determined that the synchronization information S has been received, the procedure advances to Step S404, or otherwise returns to Step S403.

(Step S404) The distribution data presence/absence detection section 711 of the reception device 4 determines whether or not the data D is to be transmitted from the radio base station 2 to the reception device groups 31-1 to 3m-n to which the reception device itself belongs (own reception device groups), based on the group-basis distribution data presence/absence information H and the storage contents in the own group information storage section 717 included in the synchronization information S received by the radio communication section 72.

Specifically, if the value of the group-basis distribution data presence/absence information H on the reception device groups 31-1 to 3m-n to which the reception device 4 belongs is "1", it is determined that the data D is to be transmitted from the radio base station 2, and if the value of the group-basis distribution data presence/absence information H is "0", it is determined that the data D is not to be transmitted from the radio base station 2. If it is determined that the transmission is to be performed, the procedure advances to Step S405, or otherwise advances to Step S415.

(Step S405) Based on the address information transmission start information At included in the synchronization information S received by the radio communication section 72, the address information transmission start time detection section 715 of the reception device 4 detects a time at which the address information A is to be transmitted from the radio base stations 2-1 to 2-m to the reception device groups 31-1 to 3m-n. After that, the procedure advances to Step S406.

(Step S406) The power supply control section 714 of the reception device 4 controls the switch section 73 to interrupt the power being supplied to the radio circuit of the radio communication section 72. After that, the procedure advances to Step S407.

(Step S407) The reception time setting section 712 of the reception device 4 determines whether or not a time at which the address information A is transmitted to the own reception device groups 31-1 to 3m-n from radio base stations 2-1 to 2-m has been reached. If it is determined that the time for the transmission has been reached, the procedure advances to Step S408, or otherwise returns to Step S407.

(Step S408) The power supply control section 714 of reception device 4 controls the switch section 73 to supply power to the radio circuit of the radio communication section 72. After that, the procedure advances to Step S409.

(Step S409) The radio communication section 72 of the reception device 4 receives the address information A transmitted from the radio base stations 2-1 to 2-m. After that, the procedure advances to Step S410.

(Step S410) The distribution data presence/absence detection section 711 of the reception device 4 determines whether or not the address information A addressed to the own terminal is included in the address information A received in Step S409. If it is determined that the address information A is included, the procedure advances to Step S411, or otherwise advances to Step S415.

(Step S411) The power supply control section 714 of the reception device 4 controls the switch section 73 to interrupt the power being supplied to the radio circuit of the radio communication section 72. After that, the procedure advances to Step S412.

(Step S412) The reception time setting section 712 of the reception device 4 determines whether or not a time at which the data D is transmitted from the radio base stations 2-1 to 2-$m$ to the own reception device 4 has been reached. If it is determined that the time for the transmission has been reached, the procedure advances to Step S413, or otherwise returns to Step S412.

(Step S413) The power supply control section 714 of the reception device 4 controls the switch section 73 to supply power to the radio circuit of the radio communication section 72. The group-specific data item Dn within the data D is transmitted in order of the group number as illustrated in FIG. 17, and hence the switch section 73 is controlled in synchronization with a transmission timing for the data D addressed to the own reception device. After that, the procedure advances to Step S414.

(Step S414) The radio communication section 72 of the reception device 4 receives the data D transmitted from the radio base stations 2-1 to 2-$m$. After that, the procedure advances to Step S415.

(Step S415) After reception of the data D addressed to the self, the power supply control section 714 of the reception device 4 controls the switch section 73 to interrupt the power being supplied to the radio circuit of the radio communication section 72. After that, the procedure advances to Step S416.

(Step S416) The reception time setting section 712 of the reception device 4 determines whether or not a time at which the synchronization information S is transmitted from the radio base stations 2-1 to 2-$m$ has been reached. If it is determined that the time for the transmission has been reached, the procedure returns to Step S401, or otherwise returns to Step S416.

Note that, in this flowchart, with regard to the timing to interrupt the power supply to the radio circuit, there are a method in which transmission time periods for the synchronization information S, the address informationA, and the data D are previously set and the interruption is performed at a point in time when the set period has elapsed after the reception, a method in which end bits indicating the end of transmission are added to the synchronization information S, the address informationA, and the data D and the interruption is performed at a point in time when the reception of the end bit is detected, and other such methods.

A specific example of on/off timings of power supplied to the radio circuit of the respective reception devices 4 in a case where the data D to be transmitted to the own reception device groups 31-1 to 3$m$-$n$ is not included in the frame (the data D is not to be transmitted from the radio base stations 2-1 to 2-$m$ to the own reception device groups 31-1 to 3$m$-$n$) is the same as the example illustrated in FIG. 11 according to the first embodiment, and hence description thereof is omitted herein.

Figure 20:
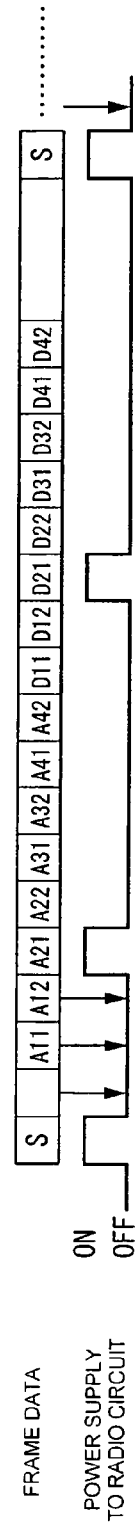
FIG. 20 is a diagram illustrating on/off timings of power supplied to a radio circuit of the reception device according to the second embodiment.

FIG. 20 is referenced to describe a specific example of on/off timings of power supplied to the radio circuit of the reception device 4 in a case where the data D to be transmitted to the own reception device groups 31-1 to 3$m$-$n$ is included in the frame (the data D is to be transmitted from the radio base stations 2-1 to 2-$m$ to the own reception device groups 31-1 to 3$m$-$n$).

The reception device 4 belonging to the reception device group 31-2 has the power supplied to the radio circuit of the reception device 4 at a timing at which the synchronization information S within the frame is transmitted from the radio base station 2-1, at a timing at which the address information item A21 within the frame is transmitted from the radio base station 2-1, and at a timing at which the data item D21 is transmitted from the radio base station 2-1.

FIG. 20 is a diagram illustrating the on/off timings of the power supplied to the radio circuit of the reception device 4 according to this embodiment.

The frame data illustrated in FIG. 20 indicates a frame structure in a case where the reception device groups 31-1 to 3$m$-$n$ to communicate to the radio base station 2-1 illustrated in FIG. 13 are four groups with two reception devices 4 being included in each of the reception device groups. Here, respectively, A11 and A12 are individual address information items with respect to the reception devices within the first reception device group 31-1, A21 and A22 are address information items with respect to the individual reception devices within the second reception device group 31-2, A31 and A32 are address information items with respect to the individual reception devices within the third reception device group 31-3, A41 and A42 are address information items with respect to the individual reception devices within the fourth reception device group 31-4, D11 and D12 are data items with respect to the individual reception devices within the first reception device group 31-1, D21 and D22 are data items with respect to the individual reception devices within the second reception device group 31-2, D31 and D32 are data items with respect to the individual reception devices within the third reception device group 31-3, and D41 and D42 are data items with respect to the individual reception devices 4 within the fourth reception device group 31-4.

Further, FIG. 20 illustrates a power supply state of the radio circuit within the radio communication section 72 of the reception device 4 corresponding to the address information A21 within the second reception device group 31-2.

In the example illustrated in FIG. 20, the power is supplied to the radio circuit within the radio communication section 72 of the reception device 4 at the timing at which the synchronization information S is transmitted from the radio base station 2-1. Here, after the value of the group-basis distribution data presence/absence information item H2 on the second reception device group 31-2 and an address start time At2 are received, the radio circuit of the reception device 4 within the second reception device group 31-2 has the power supply interrupted temporarily. After that, the power is supplied to the radio circuit of the reception device 4 corresponding to the address information item A21 at a timing at which the address information item A21 addressed to the own reception device within the reception device groups 31-2 is transmitted based on the address start time At2. Here, if the address information A with respect to the own reception device 4 is confirmed, the power supply is again interrupted, and then, the power is again supplied to the radio circuit of the reception device 4 at a timing at which the data item D21 addressed to the own reception device is transmitted from the radio base station 2.

In other words, the reception device 4 belonging to the reception device group 31-2 has the power supplied to the radio circuit of the reception device 4 at the timing at which the synchronization information S within the frame is transmitted from the radio base station 2-1, at the timing at which the address information item A21 within the frame is transmitted from the radio base station 2-1, and at the timing at which the data item D21 is transmitted from the radio base station 2-1.

Note that, the address start time At2 according to this embodiment indicates the timing at which the address information item A2 with respect to the second reception device group 31-2 is transmitted. However, for example, the transmission timing for the respective address information items is fixed in the case of the reception device 4 corresponding to the address information item A22, and hence a setting may be made in advance so that the power is supplied after the address information item A21.

Further, the reception device 4 corresponding to the address information item A22 may be configured to start to supply power to the radio circuit at a timing at which the first address information item A21 with respect to the reception device groups 31-2 to which the self belongs is transmitted and to interrupt the power supply after the reception of its own address information item A22.

Meanwhile, the power is kept from being supplied to the radio circuit of the reception device 4 until the transmission of the address information item A21 is started after the transmission of the synchronization information S within the frame is completed, until the transmission of the data item D21 is started after the transmission of the address information item A21 within the frame is completed, and until the transmission of the subsequent synchronization information S after the transmission of the data item D21 within the frame is completed.

As described above, the reception device 4 according to this embodiment receives the synchronization information S including the address information transmission start information At indicating the time at which the address information is transmitted for each of the reception device groups 31-1 to 3m-n and detects the time at which the address information A is transmitted based on the received address information transmission start information At. Based on the detected time, the power supply control section 714 interrupts the power being supplied to the radio circuit until the time at which the address information A is transmitted. This can further reduce the power consumption caused by the reception device 4. Further, the battery provided to the reception device 4 can be made to last longer.

(Third Embodiment)

In the first embodiment, the power supply to the radio circuit within the radio communication section 72 of the reception device 4 is temporarily kept being interrupted until the address information A (A21 of FIG. 12) corresponding to the own reception device after the reception of the synchronization information S. However, a period for transmitting the address information A is shorter than a period for transmitting the data D. Accordingly, even if the power supply is continued until the reception of the address information A corresponding to the own reception device after the reception of the synchronization information S, it is possible to obtain an effect of further reducing the power consumption than conventional technologies.

Note that, the configurations of the data distribution management device 1 and the reception device 4 are the same as those of the first embodiment, and hence description thereof is omitted here.

Figure 21:
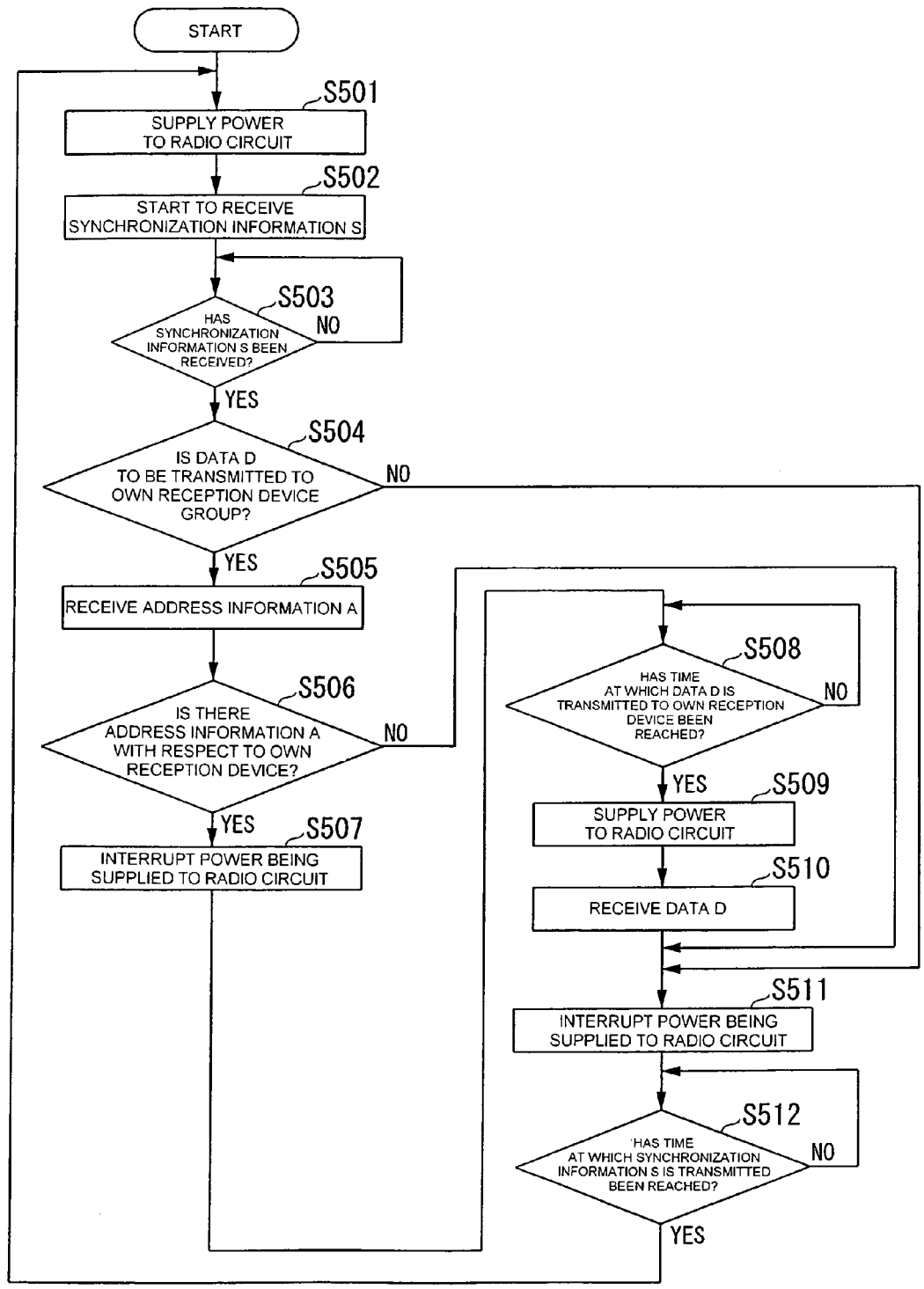
FIG. 21 is a flowchart illustrating a procedure for an operation of a reception device according to a third embodiment.

Next described is an operation of the reception device 4 according to this embodiment. FIG. 21 is a flowchart illustrating a procedure for the operation of the reception device 4 according to this embodiment.

(Step S501) The power supply control section 714 of the reception device 4 controls the switch section 73 to supply power to the radio circuit of the radio communication section 72. After that, the procedure advances to Step S502.

(Step S502) The radio communication section 72 of the reception device 4 starts to receive the synchronization information S transmitted from radio base station 2. After that, the procedure advances to Step S503.

(Step S503) The distribution data presence/absence detection section 711 of the reception device 4 determines whether or not the radio communication section 72 has received the synchronization information S. If it is determined that the synchronization information S has been received, the procedure advances to Step S504, or otherwise returns to Step S503.

(Step S504) The distribution data presence/absence detection section 711 of the reception device 4 determines whether or not the data D is to be transmitted from the radio base station 2 to the reception device groups 3-1 to 3-n to which the own reception device belongs (own reception device groups), based on the distribution data presence/absence information H included in the synchronization information S received by the radio communication section 72.

Specifically, if the value of the distribution data presence/absence information H on the reception device groups 3-1 to 3-n to which the reception device 4 itself belongs is "1", it is determined that the data D is to be transmitted thereafter from the radio base station 2 to the reception device group to which the own reception device belongs, and the procedure advances to Step S505. If the value of the distribution data presence/absence information H on the reception device groups 3-1 to 3-n to which the own reception device belongs is "0", it is determined that the data D is not to be transmitted thereafter from the radio base station 2 to the reception device group to which the own reception device belongs, and the procedure advances to Step S511.

(Step S505) The radio communication section 72 of the reception device 4 receives the address information A transmitted from the radio base station 2. After that, the procedure advances to Step S506.

(Step S506) The distribution data presence/absence detection section 711 of the reception device 4 determines whether or not the address information A addressed to the self terminal is included in the address information A received in Step S505. If it is determined that the address information A is included, the procedure advances to Step S507, or otherwise advances to Step S511.

(Step S507) The power supply control section 714 of the reception device 4 controls the switch section 73 to interrupt the power being supplied to the radio circuit of the radio communication section 72. After that, the procedure advances to Step S508.

(Step S508) The reception time setting section 712 of the reception device 4 determines whether or not a time at which the data D is transmitted to the own reception device from the radio base station 2 has been reached. If it is determined that the time for the transmission has been reached, the procedure advances to Step S509, or otherwise returns to Step S508.

(Step S509) The power supply control section 714 of reception device 4 controls the switch section 73 to supply power to the radio circuit of the radio communication section 72. Therefore, the group-specific data item Dn within the data D is transmitted in order of the group number as illustrated in FIG. 8, and hence the reception device 4 controls the switch section 73 in synchronization with a transmission timing for the data D transmitted to the self. After that, the procedure advances to Step S510.

(Step S510) The radio communication section 72 of the reception device 4 receives the data D transmitted from the radio base station 2. After that, the procedure advances to Step S511.

(Step S511) The power supply control section 714 of the reception device 4 controls the switch section 73 to interrupt the power being supplied to the radio circuit of the radio communication section 72 after the reception of the data D transmitted to the self. After that, the procedure advances to Step S512.

(Step S512) The reception time setting section 712 of the reception device 4 determines whether or not a time at which the synchronization information S is transmitted from the radio base station 2 has been reached. If it is determined that the time for the transmission has been reached, the procedure returns to Step S501, or otherwise returns to Step S512.

Note that, in this flowchart, with regard to the timing to interrupt the power supply to the radio circuit, there are a method in which transmission time periods for the synchronization information S, the address information A, and the data D are previously set and the interruption is performed at a point in time when the set period has elapsed after the reception, a method in which end bits indicating the end of transmission are added to the synchronization information S, the address information A, and the data D and the interruption is performed at a point in time when the reception of the end bit is detected, and other such methods.

Figure 22:
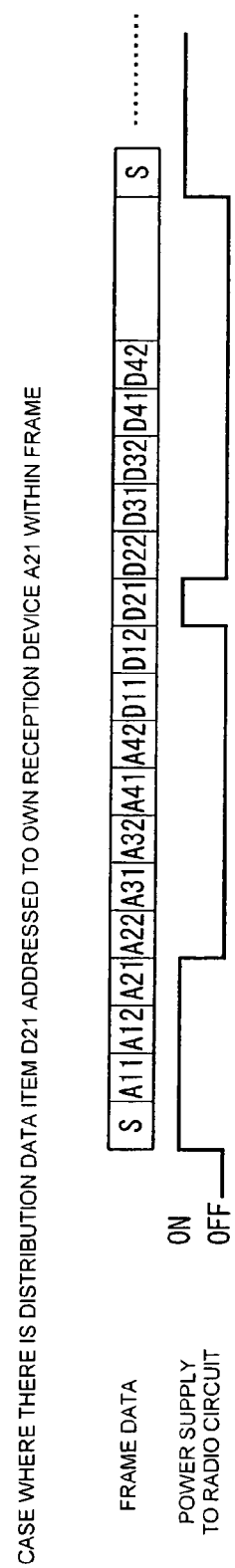
FIG. 22 is a diagram illustrating on/off timings of power supplied to a radio circuit of the reception device according to the third embodiment.

FIG. 22 is a diagram illustrating on/off timings of power supplied to the radio circuit of the radio communication section 72 of the reception device 4 whose address information is A21 among the reception devices 3-1 to 3-n illustrated in FIG. 1, according to the third embodiment. Note that, in the example illustrated in FIG. 22, the address information A transmitted to the own reception device is A21, and the data D is D21.

In the example illustrated in the figure, after the reception of the synchronization information S within the frame, the power is kept being supplied to the radio communication section 72 of the reception device 4 until the transmission of the address information item A21 within the frame to be subsequently transmitted to the own reception device is completed. When the reception of the address information item A21 within the frame is completed, the reception device 4 interrupts the power being supplied to the radio communication section 72 until the transmission of the data item D21 is started. After that, the power is supplied to the radio circuit of the radio communication section 72 of the reception device 4 at the timing at which the data item D21 addressed to the own reception device is transmitted from the radio base station 2. The power supply to the radio circuit of the radio communication section 72 of the reception device 4 is kept being interrupted until the subsequent synchronization information S is transmitted from the radio base station 2 after the transmission of the data item D21 within the frame is completed.

(Fourth Embodiment)

In the second embodiment, the power supply to the radio circuit within the radio communication section 72 of the reception device 4 is temporarily kept being interrupted until the address information A (A21 of FIG. 20) corresponding to the own reception device after the reception of the synchronization information S. However, a period for transmitting the address information A is shorter than a period for transmitting the data D. Accordingly, even if the power supply is continued until the reception of the address information A corresponding to the own reception device after the reception of the synchronization information S, it is possible to obtain an effect of further reducing the power consumption than conventional technologies.

Note that, the configurations of the data distribution management device 1 and the reception device 3 are the same as those of the second embodiment, and hence description thereof is omitted here.

Further, the procedure for the operation of the reception device 4 according to this embodiment is the same as the flowchart of the third embodiment illustrated in FIG. 21, and hence description thereof is similarly omitted here.

Figure 23:
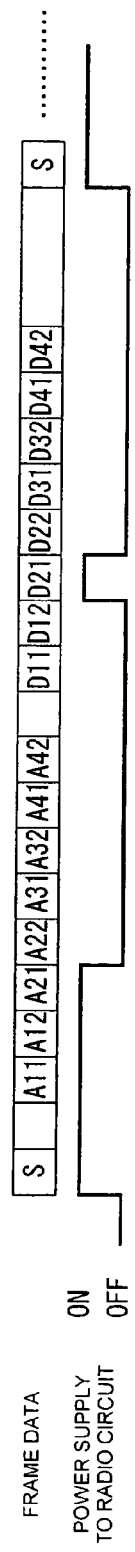
FIG. 23 is a diagram illustrating on/off timings of power supplied to a radio circuit of the reception device according to a fourth embodiment.

FIG. 23 is a diagram illustrating on/off timings of power supplied to the radio circuit of the radio communication section 72 of the reception device 4 whose address information is A21 among the reception devices 31-1 to 31-x illustrated in FIG. 13, according to the fourth embodiment. Note that, in the example illustrated in FIG. 23, the address information A transmitted to the reception device 4 is A21, and the data D is D21.

In the example illustrated in the figure, the reception device 4 has the power supplied to the radio circuit within the radio communication section 72 of the reception device 4 at the timing at which the synchronization information S addressed to the own reception device is transmitted from the radio base station 2-1. After the transmission of the synchronization information S from the radio base station 2-1 is finished, the power is kept being supplied to the radio circuit within the radio communication section 72 of the reception device 4 until the transmission of the address information item A21 to be subsequently transmitted to the own reception device is completed. When the reception of the address information item A21 within the frame is completed, the reception device 4 keeps interrupting the power being supplied to the radio circuit within the radio communication section 72 until the transmission of the data item D21 is started. After that, the power is supplied to the radio circuit within the radio communication section 72 of the reception device 4 at the timing at which the data item D21 addressed to the own reception device is transmitted from the radio base station 2.

The power supply to the radio circuit of the radio communication section 72 of the reception device 4 is kept being interrupted until the subsequent synchronization information S is transmitted from the radio base station 2 after the transmission of the data item D21 within the frame is completed.

The embodiments of the present invention have been described in detail above with reference to the drawings, but specific structures and configurations are not limited to those of the embodiments, and designs and the like within the scope that does not depart from the gist of the invention are included.

INDUSTRIAL APPLICABILITY

The present invention can be applied to a frame generation device, a reception device, a data transmission/reception system, a frame generation method, and a reception method which are used for performing radio communications, and allows further reduction of the power consumption caused by the reception device.

REFERENCE SIGNS LIST 1 data distribution management device
2, 2-1~2-m radio base station
3-1~3-n, 3-1~3-x reception device
21, 41, 61 CPU
22, 42, 62 ROM
23, 43, 63 RAM
24, 65 display section
25, 45 data interface 26 input section
31 distribution data storage section
32 distribution data control section
33 connection information management section
34 transmission information generation section
35 frame data generation section
36 data distribution section
44, 64 radio circuit
51 data reception section
52 frame transmission control section
53 timing control section
54, 72 radio communication section
66, 74 battery
71 control section
73 switch section
341 synchronization information generation section
342 address information generation section
343 data generation section
344 group-basis distribution data presence/absence information generation section
345 address information transmission start information generation section
711 distribution data presence/absence detection section
712 reception time setting section
713 time information section
714 power supply control section
715 address information transmission start time detection section
716 own terminal address information storage section
717 own group information storage section

DRAWINGS

FIG. 1
1 DATA DISTRIBUTION MANAGEMENT DEVICE
2 RADIO BASE STATION
4 RECEPTION DEVICE
FIG. 2
1 DATA DISTRIBUTION MANAGEMENT DEVICE
24 DISPLAY SECTION
25 DATA INTERFACE
26 INPUT SECTION
FIG. 3
1 DATA DISTRIBUTION MANAGEMENT DEVICE
31 DISTRIBUTION DATA STORAGE SECTION
32 DISTRIBUTION DATA CONTROL SECTION
33 CONNECTION INFORMATION MANAGEMENT SECTION
34 TRANSMISSION INFORMATION GENERATION SECTION
35 FRAME DATA GENERATION SECTION
36 DATA DISTRIBUTION SECTION
341 SYNCHRONIZATION INFORMATION GENERATION SECTION
342 ADDRESS INFORMATION GENERATION SECTION
343 DATA GENERATION SECTION
344 GROUP-BASIS DISTRIBUTION DATA PRESENCE/ABSENCE INFORMATION GENERATION SECTION
(1) DATA MAY BE INPUT FROM EXTERNAL PORTION BY POS OR THE LIKE
FIG. 4
2 RADIO BASE STATION
44 RADIO CIRCUIT
45 DATA INTERFACE
FIG. 5
2 RADIO BASE STATION
51 DATA RECEPTION SECTION
52 FRAME TRANSMISSION CONTROL SECTION
53 TIMING CONTROL SECTION
54 RADIO COMMUNICATION SECTION
FIG. 6
64 RADIO CIRCUIT
65 DISPLAY SECTION
66 BATTERY
FIG. 7
4 RECEPTION DEVICE
71 CONTROL SECTION
72 RADIO COMMUNICATION SECTION
73 SWITCH SECTION
74 BATTERY
711 DISTRIBUTION DATA PRESENCE/ABSENCE DETECTION SECTION
712 RECEPTION TIME SETTING SECTION
713 TIME INFORMATION SECTION (CLOCK)
714 POWER SUPPLY CONTROL SECTION
716 OWN TERMINAL ADDRESS INFORMATION STORAGE SECTION
717 OWN GROUP INFORMATION STORAGE SECTION
FIG. 8
(1) CASE WHERE ADDRESS SIGNAL START TIME IS FIXED SUCH AS CASE WHERE THERE IS ONLY ONE BASE STATION
(2) GROUP-BASIS DISTRIBUTION DATA PRESENCE/ABSENCE INFORMATION Hn: DISTRIBUTION DATA PRESENCE/ABSENCE INFORMATION ON GROUP n
FIG. 9
S101 HAS TIME TO GENERATE FRAME BEEN REACHED?
S102 START FRAME GENERATION
S103 IS THERE ANY DISTRIBUTION DATA?
S104 SET GROUP-BASIS DISTRIBUTION DATA PRESENCE/ABSENCE INFORMATION H TO "1" (PRESENT)
S105, S5118 GENERATE BIT SYNCHRONIZATION INFORMATION B
S106, S119 GENERATE FRAME INFORMATION F
S107, S120 GENERATE SYNCHRONIZATION INFORMATION S
S108 GENERATE ADDRESS INFORMATION A
S109 GENERATE DATA D
S110 GENERATE FRAME
S111, S121 HAS TIME TO TRANSMIT SYNCHRONIZATION INFORMATION S BEEN REACHED?
S112, S122 TRANSMIT SYNCHRONIZATION INFORMATION S
S113 HAS TIME TO TRANSMIT ADDRESS INFORMATION A BEEN REACHED?
S114 TRANSMIT ADDRESS INFORMATION A
S115 HAS TIME TO TRANSMIT DATA D BEEN REACHED?
S116 TRANSMIT DATA D
S117 SET GROUP-BASIS DISTRIBUTION DATA PRESENCE/ABSENCE INFORMATION H TO "0" (ABSENT)
(1) START
FIG. 10
S201, S207, S212 SUPPLY POWER TO RADIO CIRCUIT
S202 START TO RECEIVE SYNCHRONIZATION INFORMATION S
S203 HAS SYNCHRONIZATION INFORMATION S BEEN RECEIVED?
S204 IS DATA D TO BE TRANSMITTED TO OWN RECEPTION DEVICE GROUP?

S205, S210, S214 INTERRUPT POWER BEING SUPPLIED TO RADIO CIRCUIT
S206 HAS TIME AT WHICH ADDRESS INFORMATION A IS TRANSMITTED TO OWN RECEPTION DEVICE GROUP BEEN REACHED?
S208 RECEIVE ADDRESS INFORMATION A
S209 IS THERE ADDRESS INFORMATION A WITH RESPECT TO OWN RECEPTION DEVICE?
S211 HAS TIME AT WHICH DATA D IS TRANSMITTED TO OWN RECEPTION DEVICE BEEN REACHED?
S213 RECEIVE DATA D
S215 HAS TIMEAT WHICH SYNCHRONIZATION INFORMATION S IS TRANSMITTED BEEN REACHED?
(1) START
FIG. 11
(1) CASE WHERE THERE IS NO DISTRIBUTION DATA ADDRESSED TO OWN RECEPTION DEVICE WITHIN FRAME
(2) FRAME CYCLE
(3) FRAME DATA
(4) POWER SUPPLY TO RADIO CIRCUIT
FIG. 12
(1) CASE WHERE THERE IS DISTRIBUTION DATA ITEM D21 ADDRESSED TO OWN RECEPTION DEVICE A21 WITHIN FRAME
(2) FRAME DATA
(3) POWER SUPPLY TO RADIO CIRCUIT
FIG. 13
1 DATA DISTRIBUTION MANAGEMENT DEVICE
2-1, 2-$m$ RADIO BASE STATION
FIG. 14
1 DATA DISTRIBUTION MANAGEMENT DEVICE
31 DISTRIBUTION DATA STORAGE SECTION
32 DISTRIBUTION DATA CONTROL SECTION
33 CONNECTION INFORMATION MANAGEMENT SECTION
34 TRANSMISSION INFORMATION GENERATION SECTION
35 FRAME DATA GENERATION SECTION
36 DATA DISTRIBUTION SECTION
341 SYNCHRONIZATION INFORMATION GENERATION SECTION
342 ADDRESS INFORMATION GENERATION SECTION
343 DATA GENERATION SECTION
344 GROUP-BASIS DISTRIBUTION DATA PRESENCE/ABSENCE INFORMATION GENERATION SECTION
345 ADDRESS INFORMATION TRANSMISSION START INFORMATION GENERATION SECTION
(1) DATA MAY BE INPUT FROM EXTERNAL PORTION BY POS OR THE LIKE
FIG. 15
4 RECEPTION DEVICE
71 CONTROL SECTION
72 RADIO COMMUNICATION SECTION
73 SWITCH SECTION
74 BATTERY
711 DISTRIBUTION DATA PRESENCE/ABSENCE DETECTION SECTION
712 RECEPTION TIME SETTING SECTION
713 TIME INFORMATION SECTION (CLOCK)
714 POWER SUPPLY CONTROL SECTION
715 ADDRESS INFORMATION TRANSMISSION START TIME DETECTION SECTION
716 OWN TERMINAL ADDRESS INFORMATION STORAGE SECTION
717 OWN GROUP INFORMATION STORAGE SECTION
FIG. 16
2-1, 2-2, 2-$m$ RADIO BASE STATION
S1, S2, Sm SYNCHRONIZATION SIGNAL
A1, A2, Am ADDRESS INFORMATION
D1, D2, Dm DATA
FIG. 17
(1) CASE WHERE ADDRESS START TIME VARIES SUCH AS CASE WHERE PLURALITY OF BASE STATIONS ARE SYNCHRONIZED
(2) FRAME STRUCTURE
(3) SYNCHRONIZATION INFORMATION S STRUCTURE
(4) GROUP-BASIS DISTRIBUTION DATA PRESENCE/ABSENCE INFORMATION $H_n$: DISTRIBUTION DATA PRESENCE/ABSENCE INFORMATION ON GROUP n
ADDRESS START TIME $At_n$: ADDRESS SIGNAL START TIME FOR GROUP n
DISTRIBUTION DATA INFORMATION H IS INFORMED OF WITH AS SMALL DATA AMOUNT AS POSSIBLE (FOR EXAMPLE, 1 BIT)
CASE WHERE ADDRESS START TIME At IS NOT SET MAY BE REGARDED AS NO DISTRIBUTION DATA TO OMIT H
FIG. 18
S301 HAS TIME TO GENERATE FRAME BEEN REACHED?
S302 START FRAME GENERATION
S303 IS THERE ANY DISTRIBUTION DATA?
S304 SET GROUP-BASIS DISTRIBUTION DATA PRESENCE/ABSENCE INFORMATION H TO "1" (PRESENT)
S305, S318 GENERATE BIT SYNCHRONIZATION INFORMATION B
S306, S319 GENERATE FRAME INFORMATION F
S306' CREATE ADDRESS INFORMATION TRANSMISSION START INFORMATION At
S307, S320 GENERATE SYNCHRONIZATION INFORMATION S
S308 GENERATE ADDRESS INFORMATION A
S309 GENERATE DATA D
S310 GENERATE FRAME
S311, S321 HAS TIME TO TRANSMIT SYNCHRONIZATION INFORMATION S BEEN REACHED?
S312, S322 TRANSMIT SYNCHRONIZATION INFORMATION S
S313 HAS TIME TO TRANSMIT ADDRESS INFORMATION A BEEN REACHED?
S314 TRANSMIT ADDRESS INFORMATION A
S315 HAS TIME TO TRANSMIT DATA D BEEN REACHED?
S316 TRANSMIT DATA D
S317 SET GROUP-BASIS DISTRIBUTION DATA PRESENCE/ABSENCE INFORMATION H TO "0" (ABSENT)
(1) START
(2) CREATE ADDRESS SIGNAL START TIMES WHOSE NUMBER CORRESPONDS TO NUMBER OF GROUPS
(3) PERFORM PARALLEL PROCESSING FOR EACH BASE STATION IF THERE ARE PLURALITY OF BASE STATIONS

FIG. 19
S401, S408, S413 SUPPLY POWER TO RADIO CIRCUIT
S402 START TO RECEIVE SYNCHRONIZATION INFORMATION S
S403 HAS SYNCHRONIZATION INFORMATION S BEEN RECEIVED?
S404 IS DATA D TO BE TRANSMITTED TO OWN RECEPTION DEVICE GROUP?
S405 DETECT TIME AT WHICH ADDRESS INFORMATION A IS TO BE TRANSMITTED
S406, S411, S415 INTERRUPT POWER BEING SUPPLIED TO RADIO CIRCUIT
S407 HAS TIME AT WHICH ADDRESS INFORMATION A IS TRANSMITTED TO OWN RECEPTION DEVICE GROUP BEEN REACHED?
S409 RECEIVE ADDRESS INFORMATION A
S410 IS THERE INFORMATION A WITH RESPECT TO OWN RECEPTION DEVICE?
S412 HAS TIME AT WHICH DATA D IS TRANSMITTED TO OWN RECEPTION DEVICE BEEN REACHED?
S414 RECEIVE DATA D
S416 HAS TIME AT WHICH SYNCHRONIZATION INFORMATION S IS TRANSMITTED BEEN REACHED?
(1) START
FIG. 20
(1) CASE WHERE THERE IS DISTRIBUTION DATA ITEM D21 ADDRESSED TO OWN RECEPTION DEVICE A21 WITHIN FRAME
(2) CASE WHERE ADDRESS START TIME VARIES SUCH AS CASE WHERE PLURALITY OF BASE STATIONS ARE SYNCHRONIZED
(3) FRAME DATA
(4) POWER SUPPLY TO RADIO CIRCUIT
FIG. 21
S501, S509 SUPPLY POWER TO RADIO CIRCUIT
S502 START TO RECEIVE SYNCHRONIZATION INFORMATION S
S503 HAS SYNCHRONIZATION INFORMATION S BEEN RECEIVED?
S504 IS DATA D TO BE TRANSMITTED TO OWN RECEPTION DEVICE GROUP?
S505 RECEIVE ADDRESS INFORMATION A
S506 IS THERE ADDRESS INFORMATION A WITH RESPECT TO OWN RECEPTION DEVICE?
S507, S511 INTERRUPT POWER BEING SUPPLIED TO RADIO CIRCUIT
S508 HAS TIME AT WHICH DATA D IS TRANSMITTED TO OWN RECEPTION DEVICE BEEN REACHED?
S510 RECEIVE DATA D
S512 HAS TIME AT WHICH SYNCHRONIZATION INFORMATION S IS TRANSMITTED BEEN REACHED?
(1) START
FIG. 22
(1) CASE WHERE THERE IS DISTRIBUTION DATA ITEM D21 ADDRESSED TO OWN RECEPTION DEVICE A21 WITHIN FRAME
(2) FRAME DATA
(3) POWER SUPPLY TO RADIO CIRCUIT
FIG. 23
(1) CASE WHERE THERE IS DISTRIBUTION DATA ITEM D21 ADDRESSED TO OWN RECEPTION DEVICE A21 WITHIN FRAME
(2) CASE WHERE ADDRESS START TIME VARIES SUCH AS CASE WHERE PLURALITY OF BASE STATIONS ARE SYNCHRONIZED
(3) FRAME DATA
(4) POWER SUPPLY TO RADIO CIRCUIT

The invention claimed is:

1. A frame generation device, comprising:
a frame generation section configured to generate a frame including, in a following order: synchronization information being information for achieving synchronization with a reception device included in a group that includes one or a plurality of reception devices each of which receives information within the frame used for radio communications; address information indicating an address within the frame for transmitting data; and the data to be transmitted to the reception device included in the group;
a group-basis distribution data presence/absence information generation section configured to generate group-basis distribution data presence/absence information indicating whether or not the data to be transmitted to the reception device included in the group is included in the frame;
a synchronization information generation section configured to generate the synchronization information including the group-basis distribution data presence/absence information; and
a central processing unit configured to control operation of the frame generation section, the group-basis distribution data presence/absence information generation section, and the synchronization information generation section;
wherein the frame generation section is configured to generate the frame such that the group-basis distribution data presence/absence information is allocated prior to the address information.

2. The frame generation device according to claim 1, wherein the group-basis distribution data presence/absence information generation section is configured to generate the group-basis distribution data presence/absence information in which binary information are allocated in order of each group, the binary information indicating whether or not distribution data for the each group is included.

3. A reception device, comprising:
a reception section configured to receive synchronization information, address information, and data, the synchronization information including group-basis distribution data presence/absence information indicating whether or not the data to be transmitted to the reception device included in a group that includes one or a plurality of reception devices is included in a frame including, in a following order: the synchronization information being information for achieving synchronization with a transmission device that transmits the frame used for radio communications; the address information indicating an address within the frame for transmitting the data; and the data to be transmitted to the reception device included in the group;
a determination section configured to determine, based on the group-basis distribution data presence/absence information, whether or not the address information is to be transmitted to an own reception device by using the frame;
an own terminal address information storage section configured to store address information specific to the own reception device;
an own group information storage section configured to store section information on which group the own reception device belongs to; and a central processing unit configured to control operation of the reception section, the determination section, the own terminal address information storage section, and the own group information storage section;

wherein power is supplied to the reception section when the determination section determines that the address information is to be transmitted;

wherein the power being supplied to the reception section is interrupted when the determination section determines that the address information is not to be transmitted; and wherein the reception section is configured to receive the frame in which the group-basis distribution data presence/absence information is allocated prior to the address information.

4. The reception device according to claim 3, wherein the reception section is configured to receive the group-basis distribution data presence/absence information in which binary information are allocated in order of each group, the binary information indicating whether or not distribution data for the each group is included.

5. A data transmission/reception system, comprising:
a frame generation device;
one or a plurality of reception devices; and
a transmission device configured to generate a frame generated by the frame generation device to a reception device included in a group that includes the one or the plurality of the reception devices;
wherein the frame generation device comprises:
 a frame generation section configured to generate the frame including, in a following order: synchronization information being information for achieving synchronization with the reception device included in the group that receives information within the frame used for radio communications; address information indicating an address within the frame for transmitting data; and the data to be transmitted to the reception device included in the group;
 a group-basis distribution data presence/absence information generation section configured to generate group-basis distribution data presence/absence information indicating whether or not the data to be transmitted to the reception device included in the group is included in the frame; and
 a synchronization information generation section configured to generate the synchronization information including the group-basis distribution data presence/absence information;
wherein the reception device comprises:
 a reception section configured to receive the synchronization information, the address information, and the data, the synchronization information including the group-basis distribution data presence/absence information indicating whether or not the data to be transmitted to the reception device included in the group that includes the one or the plurality of reception devices is included in the frame including, in a following order: the synchronization information being information for achieving synchronization with the transmission device that transmits the frame used for radio communications; the address information indicating the address within the frame for transmitting the data; and the data to be transmitted to the reception device;
 a determination section configured to determine, based on the group-basis distribution data presence/absence information, whether or not the address information is to be transmitted to an own reception device by using the frame;
 an own terminal address information storage section configured to store address information specific to the own reception device; and
 an own group information storage section configured to store information on which group the own reception device belongs to;
wherein power is supplied to the reception section when the determination section determines that the address information is to be transmitted;
wherein the power being supplied to the reception section is interrupted when the determination section determines that the address information is not to be transmitted; and
wherein the reception section is configured to receive the frame in which the group-basis distribution data presence/absence information is allocated prior to the address information.

6. The data transmission/reception system according to claim 5, wherein the group-basis distribution data presence/absence information generation section is configured to generate the group-basis distribution data presence/absence information in which binary information are allocated in order of each group, the binary information indicating whether or not distribution data for the each group is included; and wherein the reception section is configured to receive the group-basis distribution data presence/absence information in which the binary information are allocated in order of the each group.

7. A frame generation method, comprising:
 a frame generation step of generating a frame including, in a following order: synchronization information being information for achieving synchronization with a reception device included in a group that includes one or a plurality of reception devices each of which receives information within the frame used for radio communications; address information indicating an address within the frame for transmitting data; and the data to be transmitted to the reception device included in the group;
 a group-basis distribution data presence/absence information generation step of generating group-basis distribution data presence/absence information indicating whether or not the data to be transmitted to the reception device included in the group is included in the frame; and
 a synchronization information generation step of generating the synchronization information including the group-basis distribution data presence/absence information;
wherein the frame generation step is carried out such that the group-basis distribution data presence/absence information is allocated prior to the address information; and
wherein the frame generation step, the group-basis distribution data presence/absence information generation step, and the synchronization information generation step are carried out by a central processing unit of a frame generation device.

8. The frame generation method according to claim 7, wherein the group-basis distribution data presence/absence information generation step is carried out to generate the group-basis distribution data presence/absence information in which binary information are allocated in order of each group, the binary information indicating whether or not distribution data for the each group is included.

9. A reception method for a reception device comprising a reception section, a determination section, and a power supply control section, the reception method comprising:
- a reception step of receiving, by the reception section, synchronization information, address information, and data, the synchronization information including group-basis distribution data presence/absence information indicating whether or not the data to be transmitted to the reception device included in a group that includes one or a plurality of reception devices is included in a frame including, in a following order: the synchronization information being information for achieving synchronization with a transmission device that transmits the frame used for radio communications; the address information indicating an address within the frame for transmitting the data; and the data to be transmitted to the reception device included in the group;
- a determination step of determining, by the determination section, based on the group-basis distribution data presence/absence information, whether or not the address information is to be transmitted to an own reception device by using the frame;
- an own terminal address information storage step of storing address information specific to the own reception device;
- an own group information storage step of storing information on which group the own reception device belongs to;
- a step of supplying power to the reception section when it is determined in the determination step that the address information is to be transmitted; and
- a step of interrupting the power being supplied to the reception section when it is determined in the determination step that the address information is not to be transmitted;
- wherein the reception step is carried out to receive the frame in which the group-basis distribution data presence/absence information is allocated prior to the address information; and
- wherein the reception step, the determination step, the own terminal address information storage step, and the own group information storage step are carried out by a central processing unit of the reception device.

10. The reception method according to claim 9, wherein the reception step is carried out to receive the group-basis distribution data presence/absence information in which binary information are allocated in order of each group, the binary information indicating whether or not distribution data for the each group is included.

* * * * *